United States Patent Office 3,758,456
Patented Sept. 11, 1973

3,758,456
BETA-D-RIBOHEPTOFURANOSYL NUCLEOSIDES
Pieter C. Bax, Cupertino, and Margaret S. Henderson and David H. Rammler, Palo Alto, Calif., assignors to Syntex Corporation, Panama, Panama
No Drawing. Filed July 16, 1971, Ser. No. 163,488
Int. Cl. C07d 51/52, 51/54
U.S. Cl. 260—211.5 R
19 Claims

ABSTRACT OF THE DISCLOSURE

Novel β-D-riboheptofuranosyl nucleosides and methods of preparing such compounds. The compounds are generally prepared via a Wittig type reaction with the corresponding known 5′-aldehyde ribofuranosyl nucleoside, thereby yielding the corresponding 5′, 6′-dideoxy-β-D-ribo-hepto-5′-enofuranosyluronate ester nucleoside or 6′ - cyano - 5′,6′-dideoxy-β-D-ribo-hepto-5′-enofuranosyl nucleoside. Derivatives of this nucleosides are then prepared by a number of selective reactions described herein. The novel nucleosides have the ability to inhibit the growth of microorganisms or are intermediates for such compounds.

BACKGROUND OF THE INVENTION

(1) Field of the invention

This invention relates to β-D-riboheptofuranosyl nucleosides and methods of preparing such compounds. In a further aspect this invention relates to β-D-ribo-heptofuranosyluronic acid nucleosides and β-D-ribo-heptofuranosyluronate ester nucleosides and to methods of preparing such compounds. In a still further aspect this invention relates to β-D-riboheptofuranosyluronamide nucleosides and to methods of making such compounds. In another aspect this invention relates to 6′-cyano-β-D-riboheptofuranosyl nucleosides and to methods of making such compounds.

(2) The prior art

The general subject of nucleic acid derivatives and particularly nucleosides has generated a great deal of interest with regard to their general relationship to metabolic processes and ability to affect such processes in many organisms. However, although a great many nucleosides exist in nature, it is very difficult to isolate such nucleosides, and generally even more difficult to prepare natural or novel nucleosides synthetically. We have accordingly discovered novel β-D-ribo-heptofuranosyl nucleosides having a 7-carbon chain extending from the purine or pyrimidine base groups as contrasted with the 5-carbon chain typical of the natural nucleosides. To our knowledge, there is only one other instance of such seven chain carbon atom nucleosides being known; this being described by Howgate et al. in Carbohydrate Research, v. 12, 403 (1970).

SUMMARY OF THE INVENTION

In summary the compounds of our invention can be represented by the following generic formulas:

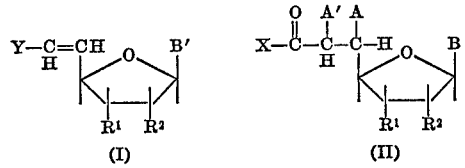

(I) (II)

and

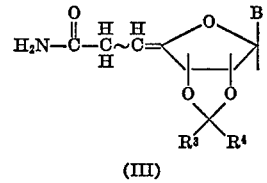

(III)

wherein Y is the group —C≡N or

wherein R is hydrogen or lower alkyl, X is the group —OR wherein R is hydrogen or lower alkyl or the group —NR$^5$R$^6$ wherein R$^5$ and R$^6$ are independently hydrogen, lower alkyl, aryl, or lower alkyl aryl; and wherein when X is —NR$^5$R$^6$ then A is hydrogen or —NR$^7$R$^8$ wherein R$^7$ and R$^8$ are independently hydrogen, lower alkyl, aryl, or lower alkyl aryl and A′ is hydrogen, and when X is the group —OR where R is lower alkyl then both A and A′ are each hydrogen or hydroxy or lower acyl and where R is H then both A and A′ are hydrogen; R$^1$ and R$^2$ are each hydroxy or together form the group

wherein R$^3$ and R$^4$ are independently selected from the group of hydrogen and lower alkyls; B is a purine or pyrimidine base as defined hereinbelow; and B$_2$ is a purine base or a pyrimidine base, as defined herein below, other than uracil or uracil derivative, and when X is —OR and A and A′ are hydrogen then B cannot be uracil or uracil derivative; and the wavy 5′, 6′-bond line in Formula III indicates that the uronamide moiety can be cis or trans with respect to the base (B) moiety.

In summary the processes of preparing the compounds of our invention comprise treating the corresponding 2′, 3′—O— alkylidenedioxy nucleoside 5′-aldehydes with a carboalkoxy methylene triphenylphosphorane or cyanomethylene triphenylphosphorane via a Wittig type reaction to obtain the corresponding compounds of Formula I. The compounds of Formula II wherein X is —OR, where R is lower alkyl, and A and A′ are H, can then be obtained by reduction of the 5′(6′) double bond of the corresponding compounds of Formula I. These compounds can be hydrolyzed to the corresponding compounds wherein X is hydroxy. The compounds of Formula II wherein both X and A are amino and the compounds of Formula III can be obtained by prolonged ammonlysis of the corresponding 5′,6′-dideoxy-2′,3′-O-isopropylidene-β-D-ribo-hept-5′-enofuranosyluronic acids or uronate ester nucleosides. The compounds of Formula II wherein X is amino and A is hydrogen can be prepared by treating the corresponding 5′,6′ - dideoxy-β-D-ribo-heptofuranosyl uronic acids or uronate ester nucleosides with ammonia. The compounds of Formula II wherein X is —OR and A and A′ are hydroxy can be prepared by oxidation of the corresponding 5′,6′ - dideoxy-2′,3′-O-alkylidene-β-D- ribohept-5′-enofuranosyluronate esters or uronic acid 2′,3′-alkylidene nucleosides. The compounds can then be converted to the compounds of Formula II wherein X is —OR′ and A and A′ are lower acyl by acylation.

The compounds and processes of our invention will be further described hereinbelow.

FURTHER DESCRIPTION OF THE INVENTION AND PREFERRED EMBODIMENTS

The compounds of our invention can be represented by the following sub-generic formulas:

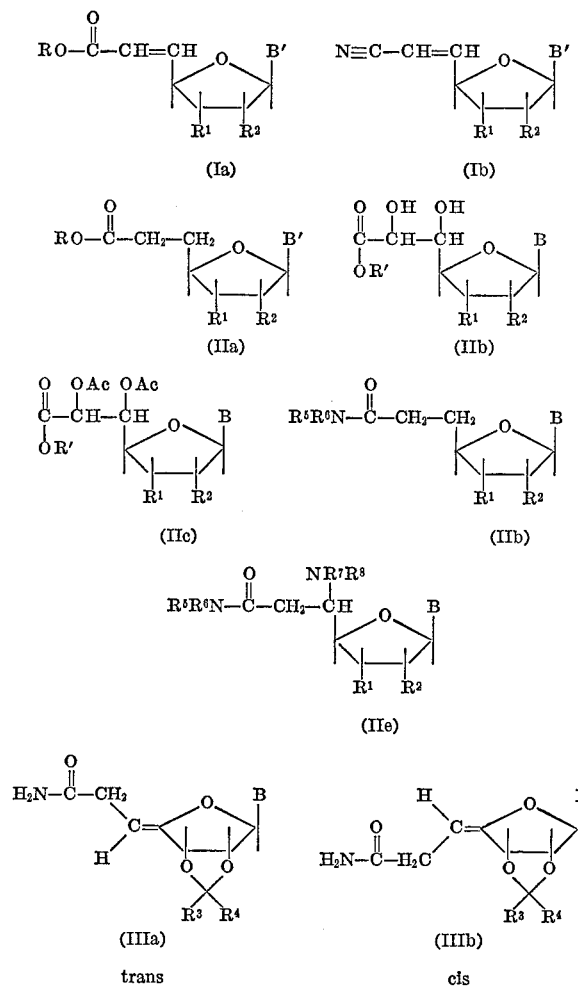

wherein Ac is lower acyl having from 1 through 7 carbon atoms; R' is lower alkyl; R is H or lower alkyl; R¹ and R² are each hydroxy or together form the group

and R³ and R⁴ are independently hydrogen or lower alkyl; R⁵, R⁶, R⁷ and R⁸ are independently hydrogen, lower alkyl, aryl or lower alkyl aryl and B is a pyrimidine base selected from the group having the formulas:

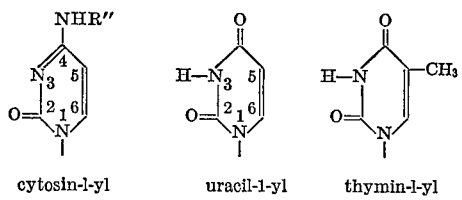

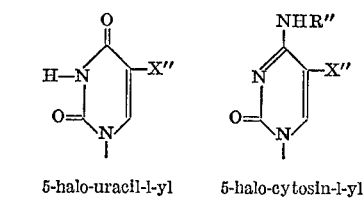

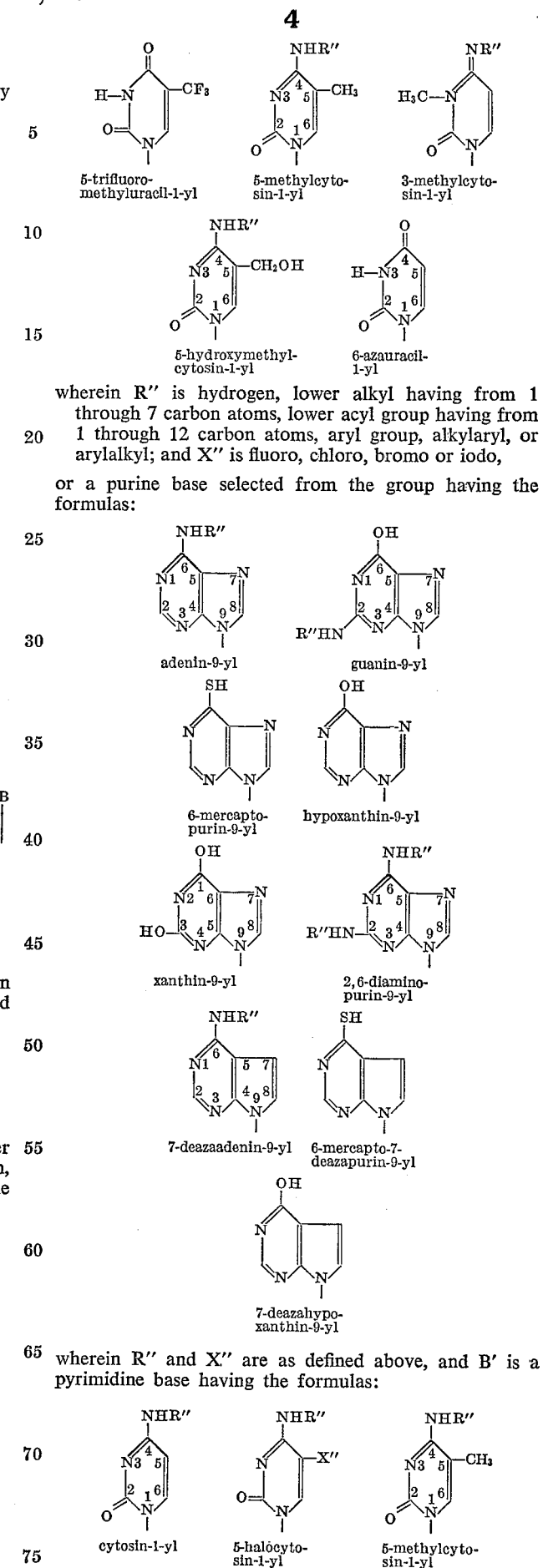

wherein R'' is hydrogen, lower alkyl having from 1 through 7 carbon atoms, lower acyl group having from 1 through 12 carbon atoms, aryl group, alkylaryl, or arylalkyl; and X'' is fluoro, chloro, bromo or iodo, or a purine base selected from the group having the formulas:

wherein R'' and X'' are as defined above, and B' is a pyrimidine base having the formulas:

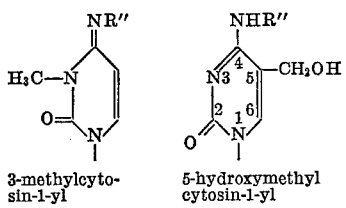

3-methylcyto-
sin-1-yl 5-hydroxymethyl
cytosin-1-yl wherein R" and X" are as defined above, or a purine base as defined herein above with respect to B.

The above definitions will be retained throughout hereinbelow and thus will not be repeated. Also as used hereinabove and below, the following terms have the following meanings unless specifically stated to the contrary. The term lower alkyl refers to alkyls having from 1 through 7 carbon atoms and includes both straight and branched chain groups. The term lower acyl refers to acyl groups having from 1 to 12 carbon atoms. Typical acyl groups include, for example, acetyl, propionyl, butyryl, t-butyryl, valeryl, isovaleryl, hexanoyl, heptanoyl, octanoyl, nonanoyl, undecanoyl, lauroyl, adamantoyl, benzoyl, p-methoxybenzoyl, p-nitrobenzoyl, phenylacetyl, phenylpropionyl, naphthylproprionyl, o-, m- p-methylbenzoyl, cyclopentyl and the like. The term aryl refers to aromatic systems such as, for example, phenylnaphthyl having from 6 to 12 carbon atoms. The term alkylaryl refers to aryl groups having one aromatic ring having one or more alkyl substituents, said alkyl substituent individual having from 1 through 7 carbon atoms and said alkyl aryl group having a total of from 7 through 13 carbon atoms. The term aryl alkyl refers to a phenyl substituted alkyl group having from 7 to 13 carbon atoms.

The preferred compounds of Formulas Ia, Ib, and IIa and Formulas IIb, IIc, IId, IIe, IIIa, and IIIb are those wherein B' and B are, respectively, selected from the group of adenine; 7-deazaadenine; 6-mercaptopurine, cytosine and 5-fluorocytosine.

Typical compounds of Formula Ia include, for example:

9-(5,6-dideoxy-β-D-ribo-hept-5-enofuranosyluronic acid) adenine;
9-(5,6-dideoxy-β-D-ribo-hept-5-enofuranosyluronic acid) guanine;
9-(5,6-dideoxy-β-D-ribo-hept-5-enofuranosyluronic acid) hypoxanthine;
9-(5,6-dideoxy-β-D-ribo-hept-5-enofuranosyluronic acid) 7-deazaadenine;
9-(5,6-dideoxy-β-D-ribo-hept-5-enofuranosyluronic acid) xanthine;
2,6-diamino-9-(5,6-dideoxy-β-D-ribo-hept-5-enofuranosyluronic acid) purine;
9-(5,6-dideoxy-β-D-ribo-hept-5-enofuranosyluronic acid) 6-mercapto-7-deazapurine;
9-(5,6-dideoxy-β-D-ribo-hept-5-enofuranosyluronic acid) 6-mercaptopurine;
1-(5,6-dideoxy-β-D-ribo-hept-5-enofuranosyluronic acid) cytosine;
1-(5,6-dideoxy-β-D-ribo-hept-5-enofuranosyluronic acid) 5-fluorocytosine;
1-(5,6-dideoxy-β-D-ribo-hept-5-enofuranosyluronic acid) 5-chlorocytosine;
1-(5,6-dideoxy-β-D-ribo-hept-5-enofuranosyluronic acid) hydroxymethylcytosine;
1-(5,6-dideoxy-β-D-ribo-hept-5-enofuranosyluronic acid) 5-methylcytosine;
9-(5,6-dideoxy-β-D-ribo-hept-5-enofuranosylmethyluronate) adenine;
9-(5,6-dideoxy-β-D-dibo-hept-5-enofuranosylmethyluronate) guanine;
9-(5,6-dideoxy-β-D-ribo-hept-5-enofuranosylmethyluronate) hypoxanthine;
9-(5,6-dideoxy-β-D-ribo-hept-5-enofuranosylmethyluronate) 7-deazaadenine;
9-(5,6-dideoxy-β-D-ribo-hept-5-enofuranosylmethyluronate) xanthine;
2,6-diamino-9-(5,6-dideoxy-β-D-ribo-hept-5-enofuranosylmethyluronate) purine;
9-(5,6-dideoxy-β-D-ribo-hept-5-enofuranosylmethyluronate) 6-mercapto-7-deazapurine;
9-(5,6-dideoxy-β-D-ribo-hept-5-enofuranosylmethyluronate) 6-mercaptopurine;
1-(5,6-dideoxy-β-D-ribo-hept-5-enofuranosylmethyluronate) cytosine; and
1-(5,6-dideoxy-β-D-ribo-hept-5-enofuranosylmethyluronate) 5-fluorocytosine.

The preferred compounds of Formula Ia are;

9-(5,6-dideoxy-β-D-ribo-hept-5-enofuranosyluronic acid) 7-deazaadenine;
9-(5,6-dideoxy-β-D-ribo-hept-5-enofuranosyluronic acid) 6-mercaptopurine;
1-(5,6-dideoxy-β-D-ribo-hept-5-enofuranosyluronic acid) cytosine;
1-(5,6-dideoxy-β-D-ribo-hept-5-enofuranosyluronic acid) 5-fluorocytosine;
9-(5,6-dideoxy-β-D-ribo-hept-5-enofuranosylmethyluronate) 6-mercaptopurine;
1-(5,6-dideoxy-β-D-ribo-hept-5-enofuranosylmethyluronate) cytosine; and
1-(5,6-dideoxy-β-D-ribo-hept-5-enofuranosylmethyluronate) 5-fluorocytosine.

Typical compounds of Formula Ib include, for example:

9-(6-cyano-5,6-dideoxy-β-D-ribo-hept-5-enofuranosyl) adenine;
9-(6-cyano-5,6-dideoxy-β-D-ribo-hept-5-enofuranosyl) guanine;
9-(6-cyano-5,6-dideoxy-β-D-ribo-hept-5-enofuranosyl) hypoxanthine;
9-(6-cyano-5,6-dideoxy-β-D-ribo-hept-5-enofuranosyl) 7-deazaadenine;
9-(6-cyano-5,6-dideoxy-β-D-ribo-hept-5-enofuranosyl) xanthine;
2,6-diamino-9-(6-cyano-5,6-dideoxy-β-D-ribo-hept-5-enofuranosyl) purine;
9-(6-cyano-5,6-dideoxy-β-D-ribo-hept-5-enofuranosyl) 6-mercapto-7-deazapurine;
9-(6-cyano-5,6-dideoxy-β-D-ribo-hept-5-enofuranosyl) 6-mercaptopurine;
1-(6-cyano-5,6-dideoxy-β-D-ribo-hept-5-enofuranosyl) cytosine;
1-(6-cyano-5,6-dideoxy-β-D-ribo-hept-5-enofuranosyl) 5-fluorocytosine;
1-(6-cyano-5,6-dideoxy-β-D-ribo-hept-5-enofuranosyl) 5-chlorocytosine;
1-(6-cyano-5,6-dideoxy-β-D-ribo-hept-5-enofuranosyl) hydroxymethylcytosine; and
1-(6-cyano-5,6-dideoxy-β-D-ribo-hept-5-enofuranosyl) 5-methylcytosine.

Typical compounds of Formula IIa include, for example:

9-(5,6-dideoxy-β-D-ribo-heptofuranosyl-uronic acid) adenine;
9-(5,6-dideoxy-β-D-ribo-heptofuranosyluronic acid) guanine;
9-(5,6-dideoxy-β-D-ribo-heptofuranosyluronic acid) hypoxanthine;
9-(5,6-dideoxy-β-D-ribo-heptofuranosyluronic acid) 7-deazaadenine;
9-(5,6-dideoxy-β-D-ribo-heptofuranosyluronic acid) xanthine;
2,6-diamino-9-(5,6-dideoxy-β-D-ribo-heptofuranosyluronic acid) purine;
9-(5,6-dideoxy-β-D-ribo-heptofuranosyluronic acid) 6-mercapto-7-deazapurine;

9-(5,6-dideoxy-β-D-ribo-heptofuranosyluronic acid) 6-mercaptopurine;
1-(5,6-dideoxy-β-D-ribo-heptofuranosyluronic acid) cytosine;
1-(5,6-dideoxy-β-D-ribo-heptofuranosyluronic acid) 5-fluorocytosine;
1-(5,6-dideoxy-β-D-ribo-heptofuranosyluronic acid) 5-chlorocytosine;
1-(5,6-dideoxy-β-D-ribo-heptofuranosyluronic acid) 5-hydroxymethylcytosine;
1-(5,6-dideoxy-β-D-ribo-heptofuranosyluronic acid) 5-methylcytosine;
9-(5,6-dideoxy-β-D-ribo-heptofuranosylmethyluronate) adenine;
9-(5,6-dideoxy-β-D-ribo-heptofuranosylmethyluronate) guanine;
9-(5,6-dideoxy-β-D-ribo-heptofuranosylmethyluronate) hypoxanthine;
9-(5,6-dideoxy-β-D-ribo-heptofuranosylmethyluronate) 7-deazaadenine;
9-(5,6-dideoxy-β-D-ribo-heptofuranosylmethyluronate) xanthine;
2,6-diamino-9-(5,6-dideoxy-β-D-ribo-heptofuranosylmethyluronate) purine;
9-(5,6-dideoxy-β-D-ribo-heptofuranosylmethyluronate) 6-mercapto-7-deazapurine;
9-(5,6-dideoxy-β-D-ribo-heptofuranosylmethyluronate) 6-mercaptopurine;
1-(5,6-dideoxy-β-D-ribo-heptofuranosylmethyluronate) cytosine; and
1-(5,6-dideoxy-β-D-ribo-heptofuranosylmethyluronate) 5-fluorocytosine.

Each of the compounds represented by Formula IIb is a mixture of four isomers. Thus, for example, the isomer mixture represented by Formula IIb wherein B' is adenine and R¹ and R² are hydroxy is a mixture of the following isomers:

9-(β-D-glycero-D-allo-heptofuranosyl uronic acid) adenine;
9-(β-D-glycero-D-talo-heptofuranosyl uronic acid) adenine;
9-(α-L-glycero-L-talo-heptofuranosyl uronic acid) adenine; and
9-(α-L-glycero-D-allo-heptofuranosyl uronic acid) adenine.

For purposes of simplicity the following illustrations of typical compounds will be stated with respect to only one of the four isomers though it should be remembered that each is only one of the above four isomer forms represented in Formula IIb:

9-(β-D-glycero-D-allo-heptofuranosyluronic acid) adenine;
9-(β-D-glycero-D-talo-heptofuranosyluronic acid) guanine;
9-(α-L-glycero-L-talo-heptofuranosyluronic acid) hypoxanthine;
9-(α-L-glycero-D-allo-heptofuranosyluronic acid)-7-deazaadenine;
9-(β-D-glycero-D-allo-heptofuranosyluronic acid) xanthine;
2,6-diamino-9-(β-D-glycero-D-talo-heptofuranosyluronic acid) purine;
9-(α-L-glycero-L-talo-heptofuranosyluronic acid) 6-mercaptopurine;
9-(α-L-glycero-D-allo-heptofuranosyluronic acid) 6-mercapto-7-deazapurine;
1-(β-D-glycero-D-allo-heptofuranosyluronic acid) uracil;
1-(β-D-glycero-D-talo-heptofuranosyluronic acid) 5-fluorouracil;
1-(α-L-glycero-L-talo-heptofuranosyluronic acid) thymine;
1-(α-L-glycero-D-allo-heptofuranosyluronic acid) 6-azauracil;
1-(β-D-glycero-D-allo-heptofuranosyluronic acid) cytosine;
1-(β-D-glycero-D-talo-heptofuranosyluronic acid) 5-fluorocytosine;
1-(α-L-glycero-L-talo-heptofuranosyluronic acid) 5-chlorocytosine;
1-(α-L-glycero-D-allo-heptofuranosyluronic acid) 5-hydroxymethylcytosine;
1-(β-D-glycero-D-allo-heptofuranosyluronic acid) 5-methylcytosine;
9-(β-D-glycero-D-talo-heptofuranosylmethyluronate) adenine;
9-(α-L-glycero-L-talo-heptofuranosylmethyluronate) guanine;
9-(α-L-glycero-D-allo-heptofuranosylmethyluronate) hypoxanthine;
9-(β-D-glycero-D-allo-heptofuranosylmethyluronate) 7-deazaadenine;
9-(β-D-glycero-D-talo-heptofuranosylmethyluronate) xanthine;
2,6-diamino-9-(α-L-glycero-L-talo-heptofuranosylmethyluronate) purine;
9-(α-L-glycero-D-allo-heptofuranosylmethyluronate) 6-mercaptopurine;
9-(β-D-glycero-D-allo-heptofuranosylmethyluronate) 6-mercapto-7-deazapurine;
1-(β-D-glycero-D-talo-heptofuranosylmethyluronate) uracil;
1-(α-L-glycero-L-talo-heptofuranosylmethyluronate) 5-fluorouracil;
1-(α-L-glycero-D-allo-heptofuranosylmethyluronate) thymine;
1-(β-D-glycero-D-allo-heptofuranosylmethyluronate) 6-azauracil;
1-(β-D-glycero-D-talo-heptofuranosylmethyluronate) cytosine;
1-(α-L-glycero-L-talo-heptofuranosylmethyluronate) 5-flurocytosine;
1-(α-L-glycero-D-allo-heptofuranosylmethyluronate) 5-chlorocytosine;
1-(β-D-glycero-D-allo-heptofuranosylmethyluronate) 5-hydroxymethylcytosine; and
1-(β-D-glycero-D-talo-heptofuranosylmethyluronate) 5-methylcytosine.

Similarly, each of the compounds represented by Formula IIc is a mixture of the same four isomer forms as in Formula IIb. Thus for purposes of simplicity, the following illustrations of typical compounds are set forth only with respect to one of the four respective isomer forms for each case though it should be remembered that each illustration is again a mixture of the four isomers and not just the isomer stated:

9-(5,6-di-O-acetyl-2,3-O-isopropylidene-β-D-glycero-D-allo-heptofuranosyluronic acid) adenine;
9-(5,6-di-O-ocetyl-2,3-O-isopropylidene-β-D-glycero-D-talo-heptofuranosyluronic acid) guanine;
9-(5,6-di-O-acetyl-2,3-O-isopropylidene-α-L-glycero-L-talo-heptofuranosyluronic acid) hypoxanthine;
9-(5,6-di-O-acetyl-2,3-O-isopropylidene-α-L-glycero-D-allo-heptofuranosyluronic acid) 7-deazaadenine;
9-(5,6-di-O-acetyl-2,3-O-isopropylidene-β-D-glycero-D-allo-heptofuranosyluronic acid) xanthine;
2,6-diamino-9-(5,6-di-O-acetyl-2,3-O-isopropylidene-β-D-glycero-D-talo-heptofuranosyluronic acid) purine;
9-(5,6-di-O-acetyl-2,3-O-isopropylidene-α-L-glycero-L-talo-heptofuranosyluronic acid) 6-mercaptopurine;
9-(5,6-di-O-acetyl-2,3-O-isopropylidene-α-L-glycero-D-allo-heptofuranosyluronic acid) 6-mercapto-7-deazapurine;
1-(5,6-di-O-acetyl-2,3-O-isopropylidene-β-D-glycero-D-allo-heptofuranosyluronic acid) uracil;

1-(5,6-di-O-acetyl-2,3-O-isopropylidene-β-D-glycero-D-talo-heptofuranosyluronic acid) 5-fluorouracil;
1-(5,6-di-O-acetyl-2,3-O-isopropylidene-α-L-glycero-L-talo-heptofuranosyluronic acid) thymine;
1-(5,6-di-O-acetyl-2,3-O-isopropylidene-α-L-glycero-D-allo-heptofuranosyluronic acid) 6-azauracil;
1-(5,6-di-O-acetyl-2,3-O-isopropylidene-β-D-glycero-D-allo-heptofuranosyluronic acid) cytosine;
1-(5,6-di-O-acetyl-2,3-O-isopropylidene-β-D-glycero-D-talo-heptofuranosyluronic acid) 5-fluorocytosine;
1-(5,6-di-O-acetyl-2,3-O-isopropylidene-α-L-glycero-L-talo-heptofuranosyluronic acid) 5-chlorocytosine;
1-(5,6-di-O-acetyl-2,3-O-isopropylidene-α-L-glycero-D-cytosine;
1-(5,6-di-O-acetyl-2,3-O-isopropylidene-β-D-glycero-D-allo-heptofuranosyluronic acid) 5-methylcytosine;
9-(5,6-di-O-acetyl-2,3-O-isopropylidene-β-D-glycero-D-talo-heptofuranosylmethyluronate) adenine;
9-(5,6-di-O-acetyl-2,3-O-isopropylidene-α-L-glycero-L-talo-heptofuranosylmethyluronate) guanine;
9-(5,6-di-O-acetyl-2,3-O-isopropylidene-α-L-glycero-D-allo-heptofuranosylmethyluronate) hypoxanthine;
9-(5,6-di-O-acetyl-2,3-O-isopropylidene-β-D-glycero-D-allo-heptofuranosylmethylurano) 7-deazaadenine;
9-(5,6-di-O-acetyl-2,3-O-isopropylidene-β-D-glycero-D-talo-heptofuranosylmethyluronate) xanthine;
2,6-diamino-9-(5,6-di-O-acetyl-2,3-O-isopropylidene-α-L-glycero-L-talo-heptofuranosylmethyluronate) purine;
9-(5,6-di-O-acetyl-2,3-O-isopropylidene-α-L-glycero-D-allo-heptofuranosylmethyluronate) 6-mercaptopurine;
9-(5,6-di-O-acetyl-2,3-O-isopropylidene-β-D-glycero-D-allo-heptofuranosylmethyluronate) 6-mercapto-7-deazapurine;
1-(5,6-di-O-acetyl-2,3-O-isopropylidene-β-D-glycero-D-talo-heptofuranosylmethyluronate) uracil;
1-(5,6-di-O-acetyl-2,3-O-isopropylidene-α-L-glycero-L-talo-heptofuranosylmethyluronate) 5-fluorouracil;
1-(5,6-di-O-acetyl-2,3-O-isopropylidene-α-L-glycero-D-allo-heptofuranosylmethyluronate) thymine;
1-(5,6-di-O-acetyl-2,3-O-isopropylidene-β-D-glycero-D-allo-heptofuranosylmethyluronate) 6-azauracil;
1-(5,6-di-O-acetyl-2,3-O-isopropylidene-β-D-glycero-D-talo-heptofuranosylmethyluronate) cytosine;
1-(5,6-di-O-acetyl-2,3-O-isopropylidene-α-L-glycero-L-talo-heptofuranosylmethyluronate) 5-fluorocytosine;
1-(5,6-di-O-acetyl-2,3-O-isopropylidene-α-L-glycero-D-allo-heptofuranosylmethyluronate) 5-chlorocytosine;
1-(5,6-di-O-acetyl-2,3,-O-isopropylidene-β-D-glycero-D-allo-heptofuranosylmethyluronate) 5-hydroxymethylcytosine; and
1-(5,6-di-O-acetyl-2,3-O-isopropylidene-β-D-glycero-D-talo-heptofuranosylmethyluronate) 5-methylcytosine.

Typical compounds of Formula IId include, for example:

9-(5,6-dideoxy-2,3-O-isopropylidene-β-D-ribo-heptofurasosyluronamide) adenine;
9-(5,6-dideoxy-2,3-O-isopropylidene-β-D-ribo-heptofuranosyluronamide) guanine;
9-(5,6-dideoxy-2,3-O-isopropylidene-β-D-ribo-heptofuranosyluronamide) hypoxanthine;
9-(5,6-dideoxy-2,3-O-isopropylidene-β-D-ribo-heptofuranosyluronamide) 7-deazaadenine;
9-(5,6-dideoxy-2,3-O-isopropylidene-β-D-ribo-heptofuranosyluronamide) xanthine;
2,6-diamino-9-(5,6-dideoxy-2,3-O-isopropylidene-β-D-ribo-heptofuranosyluronamide) purine;
9-(5,6-dideoxy-2,3-O-isopropylidene-β-D-ribo-heptofuranosyluronamide) 6-mercaptopurine;
9-(5,6-dideoxy-2,3-O-isopropylidene-β-D-ribo-heptofuranosyluronamide) 6-mercapto-7-deazapurine;
1-(5,6-dideoxy-2,3-O-isopropylidene-β-D-ribo-heptofuranosyluronamide) uracil;
1-(5,6-dideoxy-2,3-O-isopropylidene-β-D-ribo-heptofuranosyluronamide) 5-fluorouracil;
1-(5,6-dideoxy-2,3-O-isopropylidene-β-D-ribo-heptofuranosyluronamide) thymine;
1-(5,6-dideoxy-2,3-O-isopropylidene-β-D-ribo-heptofuranosyluronamide) 6-azauracil;
1-(5,6-dideoxy-2,3-O-isopropylidene-β-D-ribo-heptofuranosyluronamide) cytosine;
1-(5,6-dideoxy-2,3-O-isopropylidene-β-D-ribo-heptofuranosyluronamide) 5-fluorocytosine;
1-(5,6-dideoxy-2,3-O-isopropylidene-β-D-ribo-heptofuranosyluronamide) 5-chlorocytosine;
1-(5,6-dideoxy-2,3-O-isopropylidene-β-D-ribo-heptofuranosyluronamide) 5-hydroxymethylcytosine; and
1-(5,6-dideoxy-2,3-O-isopropylidene-β-D-ribo-heptofuranosyluronamide) 5-methylcytosine.

Each of the compounds represented by Formula IIe is a mixture of β-D-allo and α-L-talo isomers. Typical compounds of Formula IIe include the following respective isomer mixtures:

9-(5-amino-5,6-dideoxy-2,3-isopropylidene-β-D-allo and α-L-talo-heptofuranosyluronamide) adenine;
9-(5-amino-5,6-dideoxy-2,3-O-isopropylidene-β-D-allo and α-talo-heptofuranosyluranamide) guanine;
9-(5-amino-5,6-dideoxy-2,3-O-isopropylidene-β-D-allo and α-L-talo-heptofuranosyluronamide) hypoxanthine;
9-(5-amino-5,6-dideoxy-2,3-O-isopropylidene -β-D-allo and α-L-talo-heptofuranosyluronamide) 7-deazaadenine;
9-(5-amino-5,6-dideoxy-2,3-O-isopropylidene-β-D-allo and α-L-talo-heptofuranosyluronamide) xanthine;
2,6-diamino-9-(5-amino-5,6-dideoxy-2,3-O-isopropylidene-βD-allo and α-L-talo-heptofuranosyluronamide) purine;
9-(5-amino-5,6-dideoxy-2,3-O-isopropylidene-β-D-allo and α-L-talo-heptafuranosyluronamide) 6-mercaptopurine;
9-(5-amino-5,6-dideoxy)-2,3-O-isopropylidene-β-D- allo and α-L-talo-heptafuranosyluronamide) 6-mercapto-7-deazapurine;
1-(5-amino-5,6-dideoxy-2,3-O-isopropylidene-β-D-allo and α-L-talo heptofuranosyluronamide) uracil;
1-(5-amino-5,6-dideoxy-2,3-O-isopropylidene-β-D-allo and α-L-talo-heptofuranosyluronamide) 5-fluorouracil;
1-(5-amino-5,6-dideoxy-2,3-O-isopropylidene-β-D-allo and α-L-talo-heptofuranosyluronamide) thymine;
1-(5-amino-5,6-dideoxy-2,3-O-isopropylidene-β-D-allo and α-L-talo-heptofuranosyluronamide) 6-azauracil;
1-(5-amino-5,6-dideoxy-2,3-O-isopropylidene-β-D-allo and α-L-talo-heptofuranosyluronamide) cytosine;
1-(5-amino-5,6-dideoxy-2,3-O-isopropylidene-β-D-allo and α-L-talo-heptofuranosyluronamide) 5-fluorocytosine;
1-(5-amino-5,6-dideoxy-2,3-O-isopropylidene-β-D-allo and α-L-talo-heptofuranosyluronamide) 5-chlorocytosine;
1-(5-amino-5,6-dideoxy-2,3-O-isopropylidene-β-D-allo and α-L-talo-heptofuranosyluronamide) 5-hydroxymethylcytosine; and
1-(5-amino-5,6-dideoxy-2,3-O-isopropylidene-β-D-allo and α-L-talo-heptofuranosyluronamide) 5-methylcytosine.

Typical compounds of Formula IIIa include, for example:

1-(5-amino-5,6-dideoxy-2,3-O-isopropylidene-β-D-allo trans-4-enofuranosyluronamide) adenine;
9-(5,6-dideoxy-2,3-O-isopropylidene-β'-D-erythro-hept-trans-4-enofuranosyluronamide) guanine;
9-(5,6-dideoxy-2,3-O-isopropylidene-β-D-erythro-hept-trans-4-enofuranosyluronamide) hypoxanthine;
9-(5,6-dideoxy-2,3-O-isopropylidene-β-D-erythro-hept-trans-4-enofuranosyluronamide) 7-deazaadenine;

9-(5,6-dideoxy-2,3-O-isopropylidene-β-D-erythro-hept-trans-4-enofuranosyluronamide) xanthine;

2,6-diamino-9-(5,6-dideoxy-2,3-O-isopropylidene-erythro-hept-trans-4-enofuranosyluronamide) purine;

9-(5,6-dideoxy-2,3-O-isopropylidene-β-D-erythro-hept-trans-4-enofuranosyluronamide) 6-mercaptopurine;

9-(5,6-dideoxy-2,3-O-isopropylidene-β-D-erythro-hept-trans-4-enofuranosyluronamide) 6-mercapto-7-deazapurine;

1-(5,6-dideoxy-2,3-O-isopropylidene-β-D-erythro-hept-trans-4-enofuranosyluronamide) uracil;

1-(5,6-dideoxy-2,3-O-isopropylidene-β-D-erythro-hept-trans-4-enofuranosyluronamide) 5-fluorouracil;

1-(5,6-dideoxy-2,3-O-isopropylidene-β-D-erythro-hept-trans-4-enofuranosyluronamide) thymine;

1-(5,6-dideoxy-2,3-O-isopropylidene-β-D-erythro-hept-trans-4-enofuranosyluronamide) 6-azauracil;

1-(5,6-dideoxy-2,3-O-isopropylidene-β-D-ethythro-hept-trans-4-enofuranosyluronamide )cytosine;

1-(5,6-dideoxy-2,3-O-isopropylidene-β-D-erythro-hept-trans-4-enofuranosyluronamide) 5-fluorocytosine;

1-(5,6-dideoxy-2,3-O-isopropylidene-β-D-erythro-hept-trans-4-enofuranosyluronamide) 5-chlorocytosine;

1-(5,6-dideoxy-2,3-O-isopropylidene-β-D-erythro-hept-trans-4-enofuranosyluronamide) 5-hydroxymethylcytosine; and 1-(5,6-dideoxy-2,3-O-isopropylidene-β-D-erythro-hept-trans-4-enofuranosyluronamide) 5-methylcytosine.

Typical compounds of Formula IIIb include, for example:

9-(5,6-dideoxy-2,3-O-isopropylidene-β-D-erythro-hept-cis-4-enofuranosyluronamide) adenine;

9-(5,6-dideoxy-2,3-O-isopropylidene-β-D-erythro-hept-cis-4-enofuranosyluronamide) guanine;

9-(5,6-dideoxy-2,3-O-isopropylidene-β-D-erythro-hept-cis-4-enofuranosyluronamide) hypoxanthine;

9-(5,6-dideoxy-2,3-O-isopropylidene-β-D-erythro-hept-cis-4-enofuranosyluronamide) 7-deazaadenine;

9-(5,6-dideoxy-2,3-O-isopropylidene-β-D-erythro-hept-cis-4-enofuranosyluronamide xanthine;

2,6-diamino-9-(5,6-dideoxy-2,3-O-isopropylidene-β-D-erythro-hept-cis-4-enofuranosyluronamide) purine;

9-(5,6-dideoxy-2,3-O-isopropylidene-β-D-erythro-hept-cis-4-enofuranosyluronamide) 6-mercapto 7-deazapurine;

1-(5,6-dideoxy-2,3-O-isopropylidene-β-D-erythro-hept-cis-4-enofuranosyluronamide) uracil;

1-(5,6-dideoxy-2,3-O-isopropylidene-β-D-erythro-hept-cis-4-enofuranosyluronamide) 5-fluorouracil;

1-(5,6-dideoxy-2,3-O-isopropylidene-β-D-erythro-hept-cis-4-enofuranosyluronamide) thymine;

1-(5,6-dideoxy-2,3-O-isopropylidene-β-D-erythro-hept-cis-4-enofuranosyluronamide) 6-azauracil;

1-(5,6-dideoxy-2,3-O-isopropylidene-β-D-erythro-hept-cis-4-enofuranosyluronamide) cytosine;

1-(5,6-dideoxy-2,3-O-isopropylidene-β-D-erythro-hept-cis-4-enofuranosyluronamide) 5-fluorocytosine;

1-(5,6-dideoxy-2,3-O-isopropylidene-β-D-erythro-hept-cis-4-enofuranosyluronamide) 5-chlorocytosine;

1-(5,6-dideoxy-2,3-O-isopropylidene-β-D-erythro-hept-cis-4-enofuranosyluronamide) 5-hydroxymethylcytosine; and 1-(5,6-dideoxy-2,3-O-isopropylidene-β-D-erythro-hept-cis-4-enofuranosyluronamide) 5-methylcytosine.

The process, of our invention, for preparing the nucleosides of Formulas Ia and Ib, and also the uracil derivative analogs thereof, can be schematically represented by the following overall reaction equation:

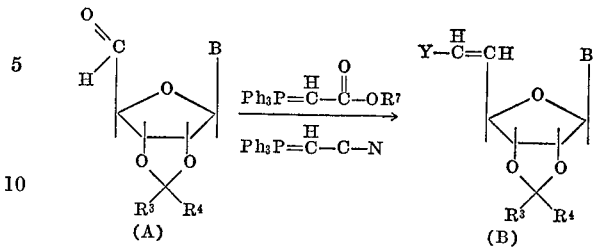

wherein Y is as defined above.

This process can be conveniently effected by treating a 5'-aldehyde nucleoside of Formula A with a suitable carboalkoxy methylenetriphenylphosphorane or cyanomethylenetriphenylphosphorane, respectively, depending on whether the compounds of Formula Ia or Ib are desired, in the presence of a suitable inert organic solvent. Typically, the treatment is conducted at temperatures in the range of about from 20 to 50° C. for about from 1 to 10 hours. However, temperatures and treatment durations both above and below these can also be used. Best results are obtained by using temperatures in the range of about from 30 to 40° C. for about from 2 to 6 hours. Typically mole ratios in the range of about from 1 to 3 moles of carboalkoxy methylenetriphenylphosphorane or cyanomethylene triphenylphosphorane is used per mole of nucleoside.

The 5'-aldehyde starting materials can be obtained from known commercial or laboratory reagent sources or can be prepared according to known procedures such as, for example, described in U.S. Pat. 3,248,380 and by Pfitzner et al., J. Am. Chem. Soc., vol. 85, 3027 (1963) or by obvious modifications of such procedures. Also, the 5'-aldehyde is preferably protected, shown in Formula A, with a 2',3'-O-alkylidenedioxy protecting group, other suitable protecting groups could also be used to protect the 2' and 3' positions such as, for example, orthoester groups, ether groups and acyl groups. Suitable carboxyalkoxy methylenetriphenylphosphorane groups which can be used include, for example, carbomethoxymethylene triphenylphosphorane, carboethoxymethylene triphenylphosphorane and the like. The phosphorane reagents can be obtained from commercial sources or prepared according to known procedures such as, for example, described in Fieser and Fieser, Reagents for Organic Synthesis, pages 112–114, John Wiley & Sons (1967) and by Isler et al., Helv. Chim. Acta. v. 40, 1242 (1957). Suitable inert organic solvents which can be used include, for example, dimethyl sulfoxide, tetrahydrofuran, and the like. We have found that particularly good results are obtained where the compounds of Formula Ia are desired, by using carbomethoxy methylenetriphenylphosphorane with dimethyl sulphoxide solvent.

Removal of the 2',3'-protecting groups, if desired, can be effected by any suitable procedure for removing the particular protecting group. For example, 2',3'-alkylidenedioxy protecting groups, or other acid labile groups, can be removed by hydrolysis with a suitable acid. For example:

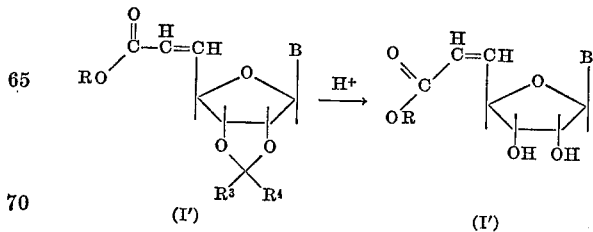

Suitable acids which can be used include, for example, formic acid, acetic acid, trifluoroacetic acid and the like. Typically the hydrolysis is conducted at temperatures in the range of about from 20 to 70° C. for about from 2 to 12 hours. However, temperatures and reaction times both above and below these ranges can also be used.

The compounds of Formula IIa and the uracil derivative analogs thereof can be prepared from the compounds of Formula Ia by the following schematic reaction equation sequence:

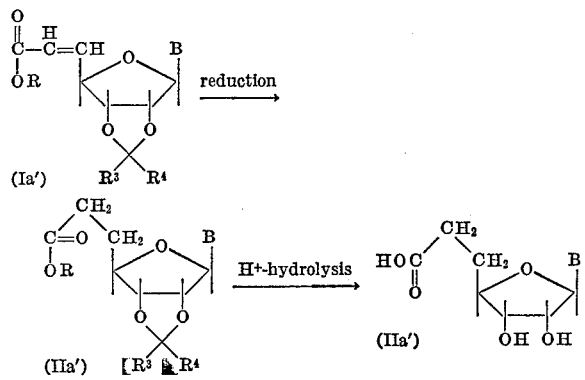

The reduction step can be effected by any suitable procedure for reducing an olefinic bond such as, for example, hydrogenation over palladium, or other suitable catalyst; or by treatment with a diimide reducing agent. We have found the latter treatment to be a particularly felicitous method of effecting this reduction. The diimide reduction is conveniently performed by treating the 5'-carboalkoxyethylene-5'-deoxy product of Formula I with a suitable diimide generating agent such as, for example, potassium azodicarboxylate, in a suitable solvent. Typically the treatment is conducted at temperatures in the range of about from 20 to 40° C. for about from 12 to 20 hours. Also, typically, a 100% stoichiometric excess of diimide generating agent is used. Suitable solvents which can be used include, for example, methanol, ethanol, pyridine, dioxane, and the like. Typically, the diimide generating agent is proton catalyzed to generate the diimide, thus it is preferable that a small amount of acid such as, for example, acetic acid, or other proton-generating agent be present. We have found that best results are obtained using potassium azodicarboxylate with a pyridine solvent containing a small amount of glacial acetic acid.

The 2',3'-O-alkylidenedioxy protecting group, or other acid labile protecting groups, can be removed in the same manner as described hereinabove with respect to the 5'-unsaturated nucleoside (Formula I).

The 5',6'-dihydroxy compounds of Formula IIb can be prepared by oxidation of the corresponding nucleosides of Formula IIa, of our invention, or where the uracil or uracil derivative nucleosides of Formula IIb, of our invention, are desired by treatment of the corresponding uracil analogs of the compounds of Formula IIa of our invention. Preferably the starting material for the oxidation step is protected at the 2' and 3' positions. The 5',6'-acyloxy compounds of Formula IIc can in turn be prepared by acylation of the corresponding 5',6'-dihydroxy compounds. The oxidation and acylation sequence can be conveniently represented by the following schematic overall reaction equation:

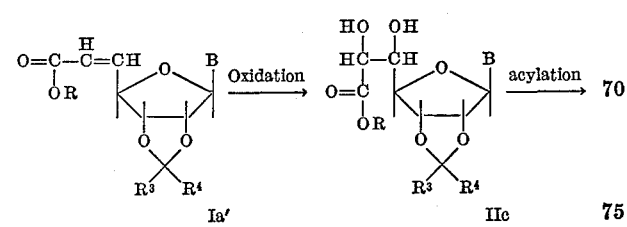

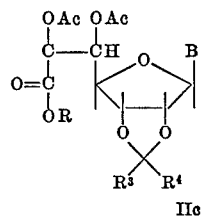

The oxidation step can be conveniently effected by treating a nucleoside of Formula IIa' with potassium permanganate, or other suitable oxidizing agent, in the presence of an inert aqueous organic reaction media such as, for example, dioxane. Typically the treatment is conducted at temperatures in the range of about from −10 to 15° C. for about from 10 to 60 minutes. However, temperatures and reaction times both above and below these ranges can be used. Also preferably a slight stoichiometric excess of oxidizing agent is used. Suitable reaction media which can be used include, for example, mixtures of dioxane and water; methanol and water; and the like.

Acylation of the 5',6'-dihydroxy compound of Formula IIb to the corresponding 5',6'-di-O-acyl compound of Formula IIc can be effected by any suitable procedure. This acylation can, for example, be conveniently effected by treating the compound of Formula IIb with an acyl acid anhydride or acid chloride of the desired acyl group, in a suitable inert organic solvent. Typically, this treatment is conducted at temperatures in the range of about from 0 to 30° C. for about from 1 to 18 hours. Typically, an excess of acid anhydride or acyl chloride is used. However, temperatures and treatment durations both above and below these ranges and also non-excess acid anhydride or acyl chloride conditions can also be used. Suitable solvents which can be used include, for example, pyridine, dimethylformamide, dioxane, and the like. Suitable acyl acid anhydrides and acyl (acid) chlorides which can be used include, for example, acetic anhydride, propionic anhydride, butyric chloride, benzoyl chloride, and the like. Optimum solvents and conditions for any given system of nucleoside of Formula IIb and acyl anhydride or acyl chloride can be determined by routine experimentation. The resulting 5',6'-di-O-acyl product of Formula IIc is a mixture of cis and trans isomers which can be separated into the respective isomers by any suitable procedure, for example, by chromatography on silicic acid.

The uronamide nucleosides of Formulas IIa and IId, of our invention, can be prepared from the corresponding compound of Formula Ia'. This preparation can be represented by the following schematic overall reaction equations:

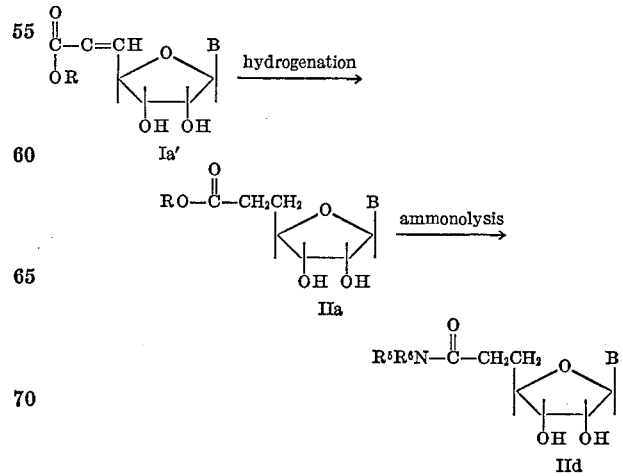

The hydrogenation step can be conveniently effected by treating the nucleosides of Formula Ia' with hydrogen, in an inert organic solvent in the presence of a suitable catalyst such as, for example, palladium, and the like. The treatment is typically conducted at temperatures in the range of about from 10 to 50° C. for about from 1 to 18 hours. The treatment is preferably conducted under anhydrous conditions. Suitable solvents, preferably anhydrous solvents, which can be used include, for example, ethanol, dioxane, ethyl acetate, and the like. The formation of amides can be accomplished by treatment with ammonia or alkyl or aryl amines.

The ammonolysis step can be conveniently effected by treating the nucleosides of Formula II with ammonium hydroxide or strong amine in a suitable inert organic solvent. Typically this treatment is conducted at temperatures in the range of about from 20 to 60° C., for about from 1 to 30 hours. Typically longer reaction times are required with lower temperatures and vice versa. Suitable solvents which can be used include, for example, dioxane, methanol, and the like. Suitable strong amines which can be used include, for example, methylamine, ethylamine, propylamine, benzylamine, and the like. The corresponding 2',3'-O-alkylidene amino compounds can be prepared in a like manner, by using the corresponding 2',3'-O-alkylidene nucleoside starting material in place of the unprotected 2'-hydroxy and 3'-hydroxy nucleosides of Formula Ia'.

The nucleosides of Formulas IIe, IIIa and IIIb can be prepared by ammonolysis of the corresponding 2',3'-unsaturated nucleosides of Formula Ia'. This can be represented by the following schematic overall reaction equation:

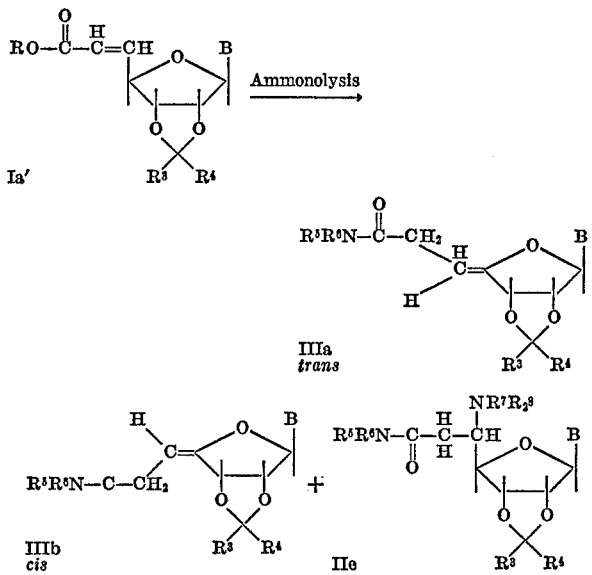

This treatment can be effected by treating the nucleosides of Formula Ia', with ammonium hydroxide or strong amine in the presence of a suitable inert organic solvent. Typically, this treatment is conducted at temperatures in the range of about from 10 to 50° C., for about from 1 to 30 hours. However, temperatures and treatment durations both above and below these can also be used. Also typically the products of Formulas IIIa and IIIb are formed more rapidly than the product of Formula IIe, thus where the product of Formula IIe is not desired, its formation can be minimized by quenching the reaction and/or rapidly removing the products of Formulas IIIa and IIIb. Suitable solvents which can be used include, for example, dioxane, methanol, and the like. Suitable strong amines which can be used include, for example, methylamine, ethylamine, propylamine, benzylamine, and the like.

Preferably, where intermediate products are formed in each of the above described treatments, such intermediates are isolated prior to their use as starting materials for the next succeeding step.

Separation and isolation of the intermediates and products can be effected by any suitable separation or purification procedure such as, for example, extraction, filtration, evaporation, crystallization, and thin-layer chromatography. Specific illustrations of typical separation and isolation procedures can be had by reference to the examples described hereinbelow. However, other equivalent separation or isolation procedures could, of course, also be used.

The compounds of Formulas I, II and III, and especially those of Formulas IIc, IIb, IIe and III, are useful in inhibiting the growth of microorganisms and thus are useful as laboratory and medical anti-infectives in situations where more economical disinfectants are either ineffective or too harsh. The compounds of Formulas I and IIa are also useful as intermediates in the preparation of the compounds of Formulas IIc, IId and III. The $N^6$-benzyladenine nucleosides of Formulas IIb, IIc, IIe and III also have utility as plant growth stimulators.

A further understanding of the invention can be had from the following non-limiting examples.

PREPARATION

This example illustrates a method of preparing 5'-aldehyde nucleoside starting material, according to the method described in U.S. Pat. No. 3,248,380.

To a substantially anhydrous solution of 1 mmole (millimole) of 2',3'-O-isopropylidene adenosine in 3 ml. of dimethyl sulfoxide, there is added 0.5 mmole of substantially anhydrous trifluoroacetic acid and 3 mmoles of substantially anhydrous N,N'-dicyclohexylcarbodiimide. The resulting reaction mixture is maintained at room temperature (about 25° C.) for 4 hours, then another mmole of substantially anhydrous N,N'-dicyclohexylcarbodiimide is added. After 4 more hours at room temperature, a final mmole of substantially anhydrous N,N'- dicyclohexylcarbodiimide is added, and the reaction mixture is allowed to stand at room temperature for an additional 10 hours, and affords 2',3'-O-isopropylidene adenosin-5'-aldehyde. The dimethyl sulfoxide is then evaporated under vacuum and the residue extracted with petroleum ether to remove unreacted N,N'-dicyclohexylcarbodiimide affording crude 2',3'-O-isopropylidene adenosine 5'-aldehyde which is chromatographically purified using a silica gel column eluting with a mixture of chloroform and methanol.

By following the same procedure using the corresponding nucleoside starting material, the following compounds are also prepared:

2',3'-O-isopropylidene-β-D-ribofuranosyl-guanine
  5'-aldehyde;
2',3'-O-isopropylidene-β-D-ribofuranosyl-xanthine
  5'-aldehyde;
2',3'-O-isopropylidene-β-D-ribofuranosyl-2,6-diamino-
  purine 5'-aldehyde;
2',3'-O-isopropylidene-β-D-ribofuranosyl-7-deazaadenine
  5'-aldehyde;
2',3'-O-isopropylidene-β-D-ribofuranosyl-6-mercapto-7-
  deazapurine 5'-aldehyde;
2',3'-O-isopropylidene-β-D-ribofuranosyl-7-deaza-
  hypoxanthine 5'-aldehyde;
2',3'-O-isopropylidene-β-D-ribofuranosyl-6-mercapto-
  purine 5'-aldehyde;
2',3'-O-isopropylidene-β-D-ribofuranosyl-hypoxanthine
  5'-aldehyde;
2',3'-O-isopropylidene-β-D-ribofuranosyl-uracil
  5'-aldehyde;
2',3'-O-isopropylidene-β-D-ribofuranosyl-cytosine
  5'-aldehyde;

2′,3′-O-isopropylidene-β-D-ribofuranosyl-thymine 5′-aldehyde;
2′,3′-O-isopropylidene-β-D-ribofuranosyl-5-methylcytosine 5′-aldehyde;
2′,3′-O-isopropylidene-β-D-ribofuranosyl-5-fluorouracil 5′-aldehyde;
2′,3′-O-isopropylidene-β-D-ribofuranosyl-5-chlorouracil 5′-aldehyde;
2′,3′-O-isopropylidene-β-D-ribofuranosyl-5-bromouracil 5′-aldehyde;
2′,3′-O-isopropylidene-β-D-ribofuranosyl-5-trifluoromethyluracil 5′-aldehyde;
2′,3′-O-isopropylidene-β-D-ribofuranosyl-3-methylcytosine 5′-aldehyde;
2′,3′-O-isopropylidene-β-D-ribofuranosyl-5-hydroxycytosine 5′-aldehyde;
2′,3′-O-isopropylidene-β-D-ribofuranosyl-6-azauracil 5′-aldehyde;
2′,3′-O-isopropylidene-β-D-ribofuranosyl-5-bromocytosine 5′-aldehyde;
2′,3′-O-isopropylidene-β-D-ribofuranosyl-5-chlorocytosine 5′-aldehyde; and
2′,3′-O-isopropylidene-β-D-ribofuranosyl-trifluorocytosine 5′-aldehyde.

EXAMPLE 1

This example illustrates a method according to our invention of preparing the compounds of Formula I of our invention and the uracil derivative analogs. In this example, 38.5 mmoles of carbomethoxymethylene triphenylphosphorane is added to a solution containing 30 mmoles of 2′,3′-O-isopropylidene adenosine 5′-aldehyde in 25 ml. of dimethyl sulfoxide at 20° C. The resulting mixture is heated to 37° C. and maintained at this temperature for 8 hours. The reaction mixture is then filtered and the resulting filtrate is partitioned between ethyl acetate and water. The organic layer is then applied to silicic acid and column (500 g.) and diluted batch-wise with ethyl acetate, and then 5% methanol-ethyl acetate. The resulting 9-(5,6-dideoxy - 2,3 - O-isopropylidene-β-D-hept-5-enofuranosylmethyluronate) adenine product is then recovered as a foam.

By following the same procedure using the corresponding nucleoside starting material, the following compounds are respectively prepared:

9-(5,6-dideoxy-2,3-O-isopropylidene-β-D-ribo-hept-5-enofuranosyluronic acid) adenine;
9-(5,6-dideoxy-2,3-O-isopropylidene-β-D-ribo-hept-5-enofuranosyluronic acid) guanine;
9-(5,6-dideoxy-2,3-O-isopropylidene-β-D-ribo-hept-5-enofuranosyluronic acid) hypoxanthine;
9-(5,6-dideoxy-2,3-O-isopropylidene-β-D-ribo-hept-5-enofuranosyluronic acid) 7-deazaadenine;
9-(5,6-dideoxy-2,3-O-isopropylidene-β-D-ribo-hept-5-enofuranosyluronic acid) xanthine;
2,6-diamino-9-(5,6-dideoxy-2,3-O-isopropylidene-β-D-ribo-hept-5-enofuranosyluronic acid) purine;
9-(5,6-dideoxy-2,3-O-isopropylidene-β-D-ribo-hept-5-enofuranosyluronic acid) 6-mercapto-7-deazapurine;
9-(5,6-dideoxy-2,3-O-isopropylidene-β-D-ribo-hept-5-enofuranosyluronic acid) 6-mercaptopurine;
1-(5,6-dideoxy-2,3-O-isopropylidene-β-D-ribo-hept-5-enofuranosyluronic acid) cytosine;
1-(5,6-dideoxy-2,3-O-isopropylidene-β-D-ribo-hept-5-enofuranosyluronic acid) 5-fluorocytosine;
1-(5,6-dideoxy-2,3-O-isopropylidene-β-D-ribo-hept-5-enofuranosyluronic acid) 5-chlorocytosine;
1-(5,6-dideoxy-2,3-O-isopropylidene-β-D-ribo-hept-5-enofuranosyluronic acid) hydroxymethylcytosine;
1-(5,6-dideoxy-2,3-O-isopropylidene-β-D-ribo-hept-5-enofuranosyluronic acid) 5-methylcytosine;
9-(5,6-dideoxy-2,3-O-isopropylidene-β-D-ribo-hept-5-enofuranosylmethyluronate) adenine;
9-(5,6-dideoxy-2,3-O-isopropylidene-β-D-ribo-hept-5-enofuranosylmethyluronate) guanine;
9-(5,6-dideoxy-2,3-O-isopropylidene-β-D-ribo-hept-5-enofuranosylmethyluronate) hypoxanthine;
9-(5,6-dideoxy-2,3-O-isopropylidene-β-D-ribo-hept-5-enofuranosylmethyluronate) 7-deazaadenine;
9-(5,6-dideoxy-2,3-O-isopropylidene-β-D-ribo-hept-5-enofuranosylmethyluronate) xanthine;
2,6-diamino-9-(5,6-dideoxy-2,3-O-isopropylidene-β-D-ribo-hept-5-enofuranosylmethyluronate) purine;
9-(5,6-dideoxy-2,3-O-isopropylidene-β-D-ribo-hept-5-enofuranosylmethyluronate) 6-mercapto-7-deazapurine;
9-(5,6-dideoxy-2,3-O-isopropylidene-β-D-ribo-hept-5-enofuranosyl) 6-mercaptopurine;
1-(5,6-dideoxy-2,3-O-isopropylidene-β-D-ribo-hept-5-enofuranosylmethyluronate) cytosine;
1-(5,6-dideoxy-2,3-O-isopropylidene-β-D-ribo-hept-5-enofuranosylmethyluronate) 5-fluorocytosine;
1-(5,6-dideoxy-2,3-O-isopropylidene-β-D-ribo-hept-5-enofuranosyluronate) 5-chlorocytosine;
1-(5,6-dideoxy-2,3-O-isopropylidene-β-D-ribo-hept-5-enofuranosyluronate) hydroxymethylcytosine; and
1-(5,6-dideoxy-2,3-O-isopropylidene-β-D-ribo-hept-5-enofuranosyluronate) 5-methylcytosine.

Similarily, by following the same procedure as above but using cyanomethylenetriphenylphosphorane in place of carbomethoxymethylenetriphenylphosphorane, the following compounds are prepared:

9-(6-cyano-5,6-dideoxy-2,3-O-isopropylidene-β-D-ribo-hept-5-enofuranosyl) adenine;
9-(6-cyano-5,6-dideoxy-2,3-O-isopropylidene-β-D-ribo-hept-5-enofuranosyl) guanine;
9-(6-cyano-5,6-dideoxy-2,3-O-isopropylidene-β-D-ribo-hept-5-enofuranosyl) hypoxanthine;
9-(6-cyano-5,6-dideoxy-2,3-O-isopropylidene-β-D-ribo-hept-5-enofuranosyl) 7-deazaadenine;
9-(6-cyano-5,6-dideoxy-2,3-O-isopropylidene-β-D-ribo-hept-5-enofuranosyl) xanthine;
2,6-diamino-9-(6-cyano-5,6-dideoxy-2,3-O-isopropylidene-β-D-ribo-hept-5-enofuranosyl) purine;
9-(6-cyano-5,6-dideoxy-2,3-O-isopropylidene-β-D-ribo-hept-5-enofuranosyl) 6-mercapto-7-deazapurine;
9-(6-cyano-5,6-dideoxy-2,3-O-isopropylidene-β-D-ribo-hept-5-enofuranosyl) 6-mercaptopurine;
1-(6-cyano-5,6-dideoxy-2,3-O-isopropylidene-β-D-ribo-hept-5-enofuranosyl) cytosine;
1-(6-cyano-5,6-dideoxy-2,3-O-isopropylidene-β-D-ribo-hept-5-enofuranosyl) 5-fluorocytosine;
1-(6-cyano-5,6-dideoxy-2,3-O-isopropylidene-β-D-ribo-hept-5-enofuranosyl) 5-chlorocytosine;
1-(6-cyano-5,6-dideoxy-2,3-O-isopropylidene-β-D-ribo-hept-5-enofuranosyl) hydroxymethylcytosine; and
1-(6-cyano-5,6-dideoxy-2,3-O-isopropylidene-β-D-ribo-hept-5-enofuranosyl) 5-methylcytosine.

EXAMPLE 1a

This example illustrates methods of preparing uracil, or uracil derivative, analogs of the compounds of Formula I. In this example a mixture of 2.84 gm. (10 mmoles) of 2′,3′-O-isopropylideneuridine, 6.20 gm. of dicyclocarbodiimide, 0.4 ml. of trifluoroacetic acid, 8 ml. of pyridine in 30 ml. of dimethyl sulfoxide is allowed to stand for 6 hours at about 20° C. The resulting formed dicyclohexylurea is then filtered off and 3.68 gm. (11 mmoles) of carbomethoxytriphenylphosphorane is then added. The resulting mixture is maintained at 37° C. for about 12 hours. After this time, 2.62 gm. of oxalic acid (in methanol) is then added, followed by the addition of 20 ml. of ethylacetate. The resulting mixture is filtered and 25 ml. of water is added to the filtrate resulting in an aqueous-organic two phase system. The organic phase is separated and concentrated by evaporation and then applied to a silicic acid column (250 gm.) and eluted with chloroform and a 1% (wt.) methanol and chloroform mixture. The appropriate fractions, as determined by thin-layer chromatography, are pooled and then evaporated affording a foam of pure 1-(5,6-dideoxy-2,3,-O-isopropylidene - $\beta$ - D - ribo hept-5-enofuranosyl uronate) uracil.

Similarly, by following the same procedure as above but using the corresponding nucleoside starting material, the following compounds are respectively prepared:

1-(5,6-dideoxy-2,3,O-isopropylidene-$\beta$-D-ribo-hept-5-enofuranosyl uronate) 5-fluorouracil;
1-(5,6-dideoxy-2,3,O-isopropylidene-$\beta$-D-ribo-hept-5-enofuranosyl uronate) 5-chlorouracil;
1-(5,6-dideoxy-2,3,O-isopropylidene-$\beta$-D-ribo-hept-5-enofuranosyl uronate) thymine; and
1-(5,6-dideoxy-2,3,O-isopropylidene-$\beta$-D-ribo-hept-5-enofuranosyl uronate) 6-azauracil.

Similarly, by following the same procedure but using cyanomethylenetriphenylphosphorane in place of carbomethoxymethylenetriphenylphosphane, and using the corresponding nucleoside starting material, the following compounds are respectively prepared:

1-(6-cyano-5,6-dideoxy-2,3-O-isopropylidene-$\beta$-D-ribo-hept-5-enofuranosyl) uracil;
1-(6-cyano-5,6-dideoxy-2,3-O-isopropylidene-$\beta$-D-ribo-hept-5-enofuranosyl) 5-fluorouracil;
1-(6-cyano-5,6-dideoxy-2,3-O-isopropylidene-$\beta$-D-ribo-hept-5-enofuranosyl) 5-chlorouracil;
1-(6-cyano-5,6-dideoxy-2,3-O-isopropylidene-$\beta$-D-ribo-hept-5-enofuranosyl) thymine; and
1-(6-cyano-5,6-dideoxy-2,3-O-isopropylidene-$\beta$-D-ribo-hept-5-enofuranosyl) 6-azauracil.

EXAMPLE 1b

This example illustrates methods removing the 2',3'-O-alkylidene protecting groups from nucleosides by acid hydrolysis. In this example one mmole of 9-(5,6-dideoxy-2,3 - O-isopropylidene-$\beta$-D-ribo-hept - 5 - enofuranosylmethyluronate) adenine is mixed with 2 ml. of 80% aqueous formic acid at 20° C. and allowed to stand for 12 hours. The reaction mixture is then evaporated to dryness and the resulting residue dissolved in 50 ml. of methanol. The pH of the resulting solution is adjusted to neutrality by the addition of a few drops of concentrated aqueous ammonium hydroxide. The mixture is then chromatographed over a silicic acid column, eluting first with ethyl acetate and then 20% methanol in ethyl acetate, affords 9 - (5,6 - dideoxy-$\beta$-D-ribo-hept-5-enofuranosylmethyluronate) adenine.

Similarly by following the same procedure as above, using the corresponding 2',3'-isopropylidene products of Examples 1 and 1a as starting materials, the corresponding unprotected forms of each of the products of Examples 1 and 1a are respectively prepared.

EXAMPLE 2

This example illustrates a method according to our invention of preparing the compounds of Formula IIa of our invention and uracil analogs. In this example, 12.35 mmoles of 9-(5,6-dideoxy-2,3-O-isopropylidene-$\beta$-D-ribo-hept-5-enofuranosylmethyluronate) adenine is dissolved in 100 ml. of ethanol at 18° C. 123.5 millimoles of freshly prepared potassium azocarboxylate is added and the resulting mixture is then slowly stirred while 10 ml. of glacial acetic acid is added dropwise. The reaction is periodically monitored by thin-layer chromatography until a permanganate negative spot of the same mobility as the starting material is shown. The methanol solvent is then evaporated and the resulting residue is then chromatographed on a silica acid column in the same manner as in Example 1. The resulting 9-(5,6-dideoxy-2,3-O - isopropylidene - $\beta$ - D-ribo-heptofuranosylmethyluronate) adenine product is isolated as a foam.

By following the same procedure set forth above using the corresponding 5',6' - dideoxy - 2',3'-O-isopropylidene-$\beta$ - D - ribo-hept - 5 - enofuranosylmethyluronate) nucleoside starting material, the following compounds are respectively prepared:

9-(5',6'-dideoxy-2',3'-O-isopropylidene-$\beta$-D-ribo-heptofuranosylmethyluronate) adenine;
9-(5',6'-dideoxy-2',3'-O-isopropylidene-$\beta$-D-ribo-heptofuranosylmethyluronate) guanine;
9-(5',6'-dideoxy-2',3'-O-isopropylidene-$\beta$-D-ribo-heptofuranosylmethyluronate) hypoxanthine;
9-(5',6'-dideoxy-2',3'-O-isopropylidene-$\beta$-D-ribo-heptofuranosylmethyluronate) 7-deazaadenine;
9-(5',6'-dideoxy-2',3'-O-isopropylidene-$\beta$-D-ribo-heptofuranosylmethyluronate) xanthine;
2,6-diamino-9-(5',6'-dideoxy-2',3'-O-isopropylidene-$\beta$-D-ribo-heptofuranosylmethyluronate) purine;
9-(5',6'-dideoxy-2',3'-O-isopropylidene-$\beta$-D-ribo-heptofuranosylmethyluronate) 6-mercapto-7-deazapurine;
9-(5',6'-dideoxy-2',3'-O-isopropylidene-$\beta$-D-ribo-heptofuranosylmethyluronate) 6-mercaptopurine;
1-(5',6'-dideoxy-2',3'-O-isopropylidene-$\beta$-D-ribo-heptofuranosylmethyluronate) cytosine;
1-(5',6'-dideoxy-2',3'-O-isopropylidene-$\beta$-D-ribo-heptofuranosylmethyluronate) 5-fluorocytosine;
1-(5',6'-dideoxy-2',3'-O-isopropylidene-$\beta$-D-ribo-heptofuranosylmethyluronate) 5-chlorocytosine;
1-(5',6'-dideoxy-2',3'-O-isopropylidene-$\beta$-D-ribo-heptofuranosylmethyluronate) hydroxymethylcytosine;
1-(5',6'-dideoxy-2',3'-O-isopropylidene-$\beta$-D-ribo-heptofuranosylmethyluronate) 5-methylcytosine;
1-(5',6'-dideoxy-2',3'-O-isopropylidene-$\beta$-D-ribo-heptofuranosylmethyluronate) uracil;
1-(5',6'-dideoxy-2',3'-O-isopropylidene-$\beta$-D-ribo-heptofuranosylmethyluronate) 5-fluorouracil;
1-(5',6'-dideoxy-2',3'-O-isopropylidene-$\beta$-D-ribo-heptofuranosylmethyluronate) 5-chlorouracil;
1-(5',6'-dideoxy-2',3'-O-isopropylidene-$\beta$-D-ribo-heptofuranosylmethyluronate) thymine; and
1-(5',6'-dideoxy-2',3'-O-isopropylidene-$\beta$-D-ribo-heptofuranosylmethyluronate) 7-deazaadenine.

The corresponding 2',3'-O-unprotected forms of each of the above compounds is prepared by respectively treating each of the above 2',3'-O-isopropylidene nucleoside products according to the procedure of Example 1b.

EXAMPLE 3

This example illustrates methods, according to our invention, of preparing the compounds of Formula IIb by oxidation of the corresponding 5',6'-dideoxy-$\beta$-D-ribo-hept-5-enofuranosyluronic acid, or ester, 2',3'-protected nucleosides. In this example 15 ml. of 1% aqueous permanganate is added to a mixture containing 1 mmole of 9 - (5,6-dideoxy-2,3-O-isopropylidene-$\beta$-D-ribo-hept-5-enofuranosylmethyluronate) adenine in 5 ml. of dioxane at 0° C. The resulting reaction mixture maintained at 0° C. for 60 minutes is then filtered through diatomaceous earth and the resulting filtrate evaporated to a crude oil. The crude oil is then chromatographed on silica gel, eluting with a 5% methanol in chloroform mixture, affording as a foam an isomer mixture of 9-(2,3-O-isopropylidene-$\beta$-D-glycero-D-allo-hept - 5 - enofuranosylmethyluronate) adenine; 9 - (2,3 - O-isopropylidene-$\beta$-D-glycero-D-talo-hept - 5 - enofuranosylmethyluronate) adenine; 9-(2,3 - O-isopropylidene-$\alpha$-L-glycero-L-talo-hept - 5-enofuranosylmethyluronate) adenine and 9-(2,3-O-isopropylidene-$\alpha$-L-glycero-D-allo-hept - 5 - enofuranosylmethyluronate) adenine.

By following the same procedure as above using the corresponding 5',6' - dideoxy-$\beta$-D-ribo-hept-5-enofuranosyluronic acid and methylester nucleosides as starting materials, the following isomer mixtures (stated in terms of the β-D-glycero-D-allo isomer for purposes of simplicity though each is a mixture of all four isomers) are respectively prepared:

9-(2,3-O-isopropylidene-β-D-glycero-D-alloy-heptofuranosyluronic acid) adenine;
9-(2,3-O-isopropylidene-β-D-glycero-D-allo-heptofuranosyluronic acid) guanine;
9-(2,3-O-isopropylidene-β-D-glycero-D-allo-heptofuranosyluronic acid) hypoxanthine;
9-(2,3-O-isopropylidene-β-D-glycero-D-allo-heptofuranosyluronic acid) 7-deazaadenine;
9-(2,3-O-isopropylidene-β-D-glycero-D-allo-heptofuranosyluronic acid) xanthine;
2,6-diamino-9-(2,3-O-isopropylidene-β-D-glycero-D-allo-heptofuranosyluronic acid) purine;
9-(2,3-O-isopropylidene-β-D-glycero-D-allo-heptofuranosyluronic acid) 6-mercaptopurine;
9-(2,3-O-isopropylidene-β-D-glycero-D-allo-heptofuranosyluronic acid) 6-mercapto-7-deazapurine;
1-(2,3-O-isopropylidene-β-D-glycero-D-allo-heptofuranosyluronic acid) uracil;
1-(2,3-O-isopropylidene-β-D-glycero-D-allo-heptofuranosyluronic acid) 5-fluorouracil;
1-(2,3-O-isopropylidene-β-D-glycero-D-allo-heptofuranosyluronic acid) thymine;
1-(2-,3-O-isopropylidene-β-D-glycero-D-allo-heptofuranosyluronic acid) 6-azauracil;
1-(2,3-O-isopropylidene-β-D-glycero-D-allo-heptofuranosyluronic acid) cytosine;
1-(2,3-O-isopropylidene-β-D-glycero-D-allo-heptofuranosyluronic acid) 5-fluorocytosine;
1-(2,3-O-isopropylidene-β-D-glycero-D-allo-heptofuranosyluronic acid) 5-chlorocytosine;
1-(2,3-O-isopropylidene-β-D-glycero-D-allo-heptofuranosyluronic acid) 5-hydroxymethylcytosine;
1-(2,3-O-isopropylidene-β-D-glycero-D-allo-heptofuranosyluronic acid) 5-methylcytosine;
9-(2,3-O-isopropylidene-β-D-glycero-D-allo-heptofuranosyluronic acid) adenine;
9-(2,3-O-isopropylidene-β-D-glycero-D-allo-heptofuranosyluronic acid) guanine;
9-(2,3-O-isopropylidene-β-D-glycero-D-allo-heptofuranosyluronic acid) hypoxanthine;
9-(2,3-O-isopropylidene-β-D-glycero-D-allo-heptofuranosyluronic acid) 7-deazaadenine;
9-(2,3-O-isopropylidene-β-D-glycero-D-allo-heptofuranosyluronic acid) xanthine;
2,6-diamino-9-(2,3-O-isopropylidene-β-D-glycero-D-allo-heptofuranosylmethyluronate) purine;
9-(2,3-O-isopropylidene-β-D-glycero-D-allo-heptofuranosylmethyluronate) 6-mercaptopurine;
9-(2,3-O-isopropylidene-β-D-glycero-D-allo-heptofuranosylmethyluronate) 6-mercapto-7-deazapurine;
1-(2,3-O-isopropylidene-β-D-glycero-D-allo-heptofuranosylmethyluronate) uracil;
1-(2,3-O-isopropylidene-β-D-glycero-D-allo-heptofuranosylmethyluronate) 5-fluorouracil;
1-(2,3-O-isopropylidene-β-D-glycero-D-allo-heptofuranosylmethyluronate) thymine;
1-(2,3-O-isopropylidene-β-D-glycero-D-allo-heptofuranosylmethyluronate) 6-azauracil;
1-(2,3-O-isopropylidene-β-D-glycero-D-allo-heptofuranosylmethyluronate) cytosine;
1-(2,3-O-isopropylidene-β-D-glycero-D-allo-heptofuranosylmethyluronate) 5-fluorocytosine;
1-(2,3-O-isopropylidene-β-D-glycero-D-allo-heptofuranosylmethyluronate) 5-chlorocytosine;
1-(2,3-O-isopropylidene-β-D-glycero-D-allo-heptofuranosylmethyluronate) 5-hydroxymethylcytosine; and
1-(2,3-O-isopropylidene-β-D-glycero-D-allo-heptofuranosylmethyluronate) 5-methylcytosine.

The corresponding 2',3'-O-unprotected forms of each of the above compounds is prepared by respectively treating each of the above corresponding 2',3'-O-isopropylidene nucleoside products according to the procedure of Example 1b.

EXAMPLE 4

This example illustrates methods, according to our invention, of preparing the 5',6'-di-O-acyloxy-nucleosides of Formula IIc, of our invention, by acylation of the corresponding heptofuranosyl uronic ester 2',3'-O-protected nucleosides. In this example 0.5 mmoles of 9-(2,3-O-isopropylidene-heptofuranosylmethyluronate) adenine isomer mixture, prepared according to Example 3, is dissolved in 2 ml. of pyridine. Two ml. of acetic anhydride is then added and the resulting reaction mixture is allowed to stand at 20° C. for 60 minutes. The reaction mixture is then poured onto ice and extracted with chloroform. The organic chloroform layer is then separated and evaporated to dryness. The resulting residue is added to 1 ml. of methanol yielding as a precipitate an isomer mixture of 9-(5,6-di-O-acetyl-2,3-O-isopropylidene-β-D-glycero-D-allo-heptofuranosylmethyluronate) adenine; 9-(5,6 - di - O - acetyl - 2,3 - O - isopropylidene - β - D-glycero-D-talo-heptofuranosylmethyluronate) adenine; 9-(5,6 - di - O - acetyl - 2,3 - O - isopropylidene - α - L-glycero-L-talo-heptofuranosylmethyluronate) adenine; and 9 - (5,6 - di - O - acetyl - 2,3 - O - isopropylidene - α - L-glycero - D - allo - heptofuranosylmethyluronate) adenine which is then recovered by filtration.

Similarly, by treating the corresponding 2',3'-O-isopropylidene-methyluronate nucleoside isomer mixture products of Example 3 according to the above procedure, the following isomer mixtures (for purposes of simplicity stated with respect to the β-D-glycero-D-allo isomer, though again an isomer mixture of all four isomers is obtained) are respectively prepared:

9-(5,6-di-O-acetyl-2,3-O-isopropylidene-β-D-glycero-D-allo-heptofuranosylmethyluronate) adenine;
9-(5,6-di-O-acetyl-2,3-O-isopropylidene-β-D-glycero-D-allo-heptofuranosylmethyluronate) guanine;
9-(5,6-di-O-acetyl-2,3-O-isopropylidene-β-D-glycero-D-allo-heptofuranosylmethyluronate) hypoxanthine;
9-(5,6-di-O-acetyl-2,3-O-isopropylidene-β-D-glycero-D-allo-heptofuranosylmethyluronate) 7-deazaadenine;
9-(5,6-di-O-acetyl-2,3-O-isopropylidene-β-D-glycero-D-allo-heptofuranosylmethyluronate) xanthine;
2,6-diamino-9(5,6-di-O-acetyl-2,3-O-isopropylidene-β-D-glycero-D-allo-heptofuranosylmethyluronate) purine;
9-(5,6-di-O-acetyl-2,3-O-isopropylidene-β-D-glycero-D-allo-heptofuranosylmethyluronate) 6-mercaptopurine;
9-(5,6-di-O-acetyl-2,3-O-isopropylidene-β-D-glycero-D-allo-heptofuranosylmethyluronate) 6-mercapto-7-deazapurine;
1-(5,6-di-O-acetyl-2,3-O-isopropylidene-β-D-glycero-D-allo-heptofuranosylmethyluronate) uracil;
1-(5,6-di-O-acetyl-2,3-O-isopropylidene-β-D-glycero-D-allo-heptofuranosylmethyluronate) 5-fluorouracil;
1-(5,6-di-O-acetyl-2,3-O-isopropylidene-β-D-glycero-D-allo-heptofuranosylmethyluronate) thymine;
1-(5,6-di-O-acetyl-2,3-O-isopropylidene-β-D-glycero-D-allo-heptofuranosylmethyluronate) 6-azauracil;
1-(5,6-di-O-acetyl-2,3-O-isopropylidene-β-D-glycero-D-allo-heptofuranosylmethyluronate) cytosine;
1-(5,6-di-O-acetyl-2,3-O-isopropylidene-β-D-glycero-D-allo-heptofuranosylmethyluronate) 5-fluorocytosine;
1-(5,6-di-O-acetyl-2,3-O-isopropylidene-β-D-glycero-D-allo-heptofuranosylmethyluronate) 5-chlorocytosine;
1-(5,6-di-O-acetyl-2,3-O-isopropylidene-β-D-glycero-D-allo-heptofuranosylmethyluronate) 5-hydroxymethylcytosine; and
1-(5,6-di-O-acetyl-2,3-O-isopropylidene-β-D-glycero-D-allo-heptofuranosylmethyluronate) 5-methylcytosine.

Similarly, by following the same procedure but using the corresponding uronic acid forms of the starting materials in place of the methyluronate ester forms, the corresponding uronic acids for each of the above compounds are respectively prepared.

The corresponding 2′,3′-O-unprotected forms of each of the above nucleosides is prepared by treating a portion of the corresponding 2′,3′-O-isopropylidene nucleosides with aqueous 80% formic acid at 20° C. for 12 hours, according to the procedure of Example 1b.

EXAMPLE 5

This example illustrates methods of preparing the compounds of Formula IIa, and uracil analogs thereof, from the corresponding unprotected 5′(6′)-unsaturated nucleosides of Formula Ia and uracil analogs, by direct catalytic hydrogenation. In this example 0.66 mmole of 9-(5,6-dideoxy - β - D - ribo-hept-5-enofuranosylmethyluronate) adenine in 200 ml. of absolute alcohol containing 1 gram of particulate 5% palladium impregnated charcoal catalyst in suspension is hydrogenated with a gentle stream of gaseous hydrogen for 15 hours at 20° C. The resulting mixture is then filtered through diatomaceous earth and the resulting filtrate then evaporated to dryness affording 9 - (5,6 - dideoxy-β-D-ribo-heptofuranosylmethyluronate) adenine which is then further purified by recrystallization using a methanol solvent.

By following the same procedure as above using the corresponding 5′(6′)-unsaturated nucleosides as starting materials, the following compounds are respectively prepared:

9-(5,6-dideoxy-β-D-ribo-heptofuranosylmethyluronate) adenine;
9-(5,6-dideoxy-β-D-ribo-heptofuranosylmethyluronate) guanine;
9-(5,6-dideoxy-β-D-ribo-heptofuranosylmethyluronate) hypoxanthine;
9-(5,6-dideoxy-β-D-ribo-heptofuranosylmethyluronate) 7-deazaadenine;
9-(5,6-dideoxy-β-D-ribo-heptofuranosylmethyluronate) xanthine;
2,6-diamino-9-(5,6-dideoxy-β-D-ribo-heptofuranosylmethyluronate) purine;
9-(5,6-dideoxy-β-D-ribo-heptofuranosylmethyluronate) 6-mercapto-7-deazapurine;
9-(5,6-dideoxy-β-D-ribo-heptofuranosylmethyluronate) 6-mercaptopurine;
1-(5,6-dideoxy-β-D-ribo-heptofuranosylmethyluronate) cytosine;
1-(5,6-dideoxy-β-D-ribo-heptofuranosylmethyluronate) 5-fluorocytosine;
1-(5,6-dideoxy-β-D-ribo-heptofuranosylmethyluronate) 5-chlorocytosine;
1-(5,6-dideoxy-β-D-ribo-heptofuranosylmethyluronate) 5-hydroxymethylcytosine;
1-(5,6-dideoxy-β-D-ribo-heptofuranosylmethyluronate) 5-methylcytosine;
1-(5,6-dideoxy-β-D-ribo-heptofuranosylmethyluronate) uracil;
1-(5,6-dideoxy-β-D-ribo-heptofuranosylmethyluronate) 5-fluorouracil;
1-(5,6-dideoxy-β-D-ribo-heptofuranosylmethyluronate) 5-chlorocytosine;
1-(5,6-dideoxy-β-D-ribo-heptofuranosylmethyluronate) thymine; and
1-(5,6-dideoxy-β-D-ribo-heptofuranosylmethyluronate) 6-azauracil.

EXAMPLE 6

This example illustrates methods of preparing the uronamide nucleosides of Formula IId, of our invention. In this example 5 ml. of aqueous concentrated ammonium hydroxide (about 30% wt. NH₃) is added to a mixture of 0.47 mmole of 9-(5,6-dideoxy-β-D-ribo-heptofuranosyluronate) adenine in 5 ml. of dioxane at 20° C. The reaction mixture is allowed to stand at 20° C. for 24 hours and then evaporated to dryness under vacuum. The resulting residue is chromatographed on silica gel, eluting with 15% methanol, 85% chloroform by vol. mixture, affording 9-(5,6-dideoxy-β-D-ribo-heptofuranosyluronamide) adenine, which is further purified by crystallization from methanol.

By following the same procedure as above using the corresponding 5′,6′-dideoxy-β-D-ribo-heptofuranosylmethyluronate nucleosides as starting materials, the following compounds are respectively prepared:

9-(5,6-dideoxy-β-D-ribo-heptofuranosyluronamide) adenine;
9-(5,6-dideoxy-β-D-ribo-heptofuranosyluronamide) guanine;
9-(5,6-dideoxy-β-D-ribo-heptofuranosyluronamide) hypoxanthine;
9-(5,6-dideoxy-β-D-ribo-heptofuranosyluronamide) 7-deazaadenine;
9-(5,6-dideoxy-β-D-ribo-heptofuranosyluronamide) xanthine;
2,6-diamino-9-(5,6-dideoxy-β-D-ribo-heptofuranosyluronamide) purine;
9-(5,6-dideoxy-β-D-ribo-heptofuranosyluronamide) 6-mercaptopurine;
9-(5,6-dideoxy-β-D-ribo-heptofuranosyluronamide) 6-mercapto-7-deazapurine;
1-(5,6-dideoxy-β-D-ribo-heptofuranosyluronamide) uracil;
1-(5,6-dideoxy-β-D-ribo-heptofuranosyluronamide) 5-fluorouracil;
1-(5,6-dideoxy-β-D-ribo-heptofuranosyluronamide) thymine;
1-(5,6-dideoxy-β-D-ribo-heptofuranosyluronamide) 6-azauracil;
1-(5,6-dideoxy-β-D-ribo-heptofuranosyluronamide) cytosine;
1-(5,6-dideoxy-β-D-ribo-heptofuranosyluronamide) 5-fluorocytosine;
1-(5,6-dideoxy-β-D-ribo-heptofuranosyluronamide) 5-chlorocyotosine;
1-(5,6-dideoxy-β-D-ribo-heptofuranosyluronamide) 5-hydroxymethylcytosine; and
1-(5,6-dideoxy-β-D-ribo-heptofuranosyluronamide) 5-methylcytosine.

Similarly, by following the same procedure as above, but using the corresponding 2′,3′-O-isopropylidene protected nucleosides as starting materials in place of the 2′,3′-unprotected nucleosides and conducting the treatment for 14 days instead of 24 hours, the corresponding 2′,3′-O-isopropylidene derivatives for each of the above products are respectively prepared.

EXAMPLE 7

This example illustrates methods of preparing the compounds of Formula IIe and IIIa and IIIb. In this example 10 ml. of aqueous ammonium hydroxide is added to the mixture containing 1 mmole of 9-(5,6-dideoxy-2,3-O-isopropylidene - β - D - ribo - hept-5-enofuranosylmethyluronate) adenine in 10 ml. of dioxane at room temperature and is maintained at this temperature for 24 hours. The solvents are then removed by vacuum evaporation affording a residue mixture of the β-D-allo and α-L-talo isomers of 9 - (5 - amino-5,6-dideoxy-2,3-O-isopropylidene-heptofuranosyluronamide) adenine and the trans and cis isomers of 9-(5,6-dideoxy-2,3-O-isopropylidene-β-D-erythro-hept-4-enofuranosyluronamide) adenine.

The residue is subjected to preparative thin-layer chromatography eluting with a 10% (vol.) mixture of methanol in chloroform. This affords as three separate individual product fractions (1) an isomer mixture of 9-(5-amino - 5,6-dideoxy-2,3-O-isopropylidene-β-D-allo-heptofuranosyluronamide) adenine and 9-(5-amino-5,6-dideoxy - 2,3-O-isopropylidene-α-L-trans-heptofuranosyluronamide) adenine; (2) the pure trans isomer 9-(5,6-dideoxy - 2,3 - O - isopropylidene-β-D-erthro-hept-trans-4-enofuranosyluronamide) adenine; and (3) the pure cis isomer 9 - (5,6 - dideoxy - 2,3-O-isopropylidene-β-D-erythro-hept-cis-4-enofuranosyluronamide) adenine.

Similarly, by following the same procedure as above using the corresponding 5'-olefinic nucleoside starting material of Formula Ia, and uracil analogs thereof, as starting materials, the following isomer mixtures of Formula IIe are respectively prepared and isolated.

9-(5-amino-5,6-dideoxy-2,3-O-isopropylidene-β-D-allo (and α-L-talo)-heptofuranosyluronamide) adenine;
9-(5-amino-5,6-dideoxy-2,3-O-isopropylidene-β-D-allo (and α-L-talo)-heptofuranosyluronamide) guanine;
9-(5-amino-5,6-dideoxy-2,3-O-isopropylidene-β-D-allo (and α-L-talo)-heptofuranosyluronamide) hypoxanthine;
9-(5-amino-5,6-dideoxy-2,3-O-isopropylidene-β-D-allo (and α-L-talo)-heptofuranosyluronamide) 7-deazaadenine;
9-(5-amino-5,6-dideoxy-2,3-O-isopropylidene-β-D-allo (and α-L-talo)-heptofuranosyluronamide) xanthine;
2,6-diamino-9-(5-amino-5,6-dideoxy-2,3-O-isopropylidene-β-D-allo (and α-L-talo)-heptofuranosyluronamide) purine;
9-(5-amino-5,6-dideoxy-2,3-O-isopropylidene-β-D-allo (and α-L-talo)-heptofuranosyluronamide) 6-mercaptopurine;
9-(5-amino-5,6-dideoxy-2,3-O-isopropylidene-β-D-allo (and α-L-talo)-heptofuranosyluronamide) 6-mercapto-7-deazapurine;
1-(5-amino-5,6-dideoxy-2,3-O-isopropylidene-β-D-allo (and α-L-talo)-heptofuranosyluronamide) uracil;
1-(5-amino-5,6-dideoxy-2,3-O-isopropylidene-β-D-allo (and α-L-talo)-heptofuranosyluronamide) 5-fluorouracil;
1-(5-amino-5,6-dideoxy-2,3-O-isopropylidene-β-D-allo (and α-L-talo)-heptofuranosyluronamide) 5-chlorouracil;
1-(5-amino-5,6-dideoxy-2,3-O-isopropylidene-β-D-allo (and α-L-talo)heptofuranosyluronamide) thymine;
1-(5-amino-5,6-dideoxy-2,3-O-isopropylidene-β-D-allo (and α-L-talo)-heptofuranosyluronamide) 6-azauracil;
1-(5-amino-5,6-dideoxy-2,3-O-isopropylidene-β-D-allo (and α-L-talo)-heptofuranosyluronamide) cytosine;
1-(5-amino-5,6-dideoxy-2,3-O-isopropylidene-β-D-allo (and α-L-talo)-heptofuranosyluronamide) 5-fluorocytosine;
1-(5-amino-5,6-dideoxy-2,3-O-isopropylidene-β-D-allo (and α-L-talo)-heptofuranosyluronamide) 5-chlorocytosine;
1-(5-amino-5,6-dideoxy-2,3-O-isopropylidene-β-D-allo (and α-L-talo)heptofuranosyluronamide) 5-hydroxymethylcytosine; and
1-(5-amino-5,6-dideoxy-2,3-O-isopropylidene-β-D-allo (and α-L-talo)-heptofuranosyluronamide) 5-methylcytosine.

Similarly, by following the same procedure as above using the corresponding 5'-olefinic nucleoside starting material of Formula Ia, and uracil analogs, as starting materials, the following trans isomers of Formula IIIa are respectively prepared and isolated:

9 - (5,6 - dideoxy-2,3-O-isopropylidene-β-D-erythro-hept-trans-4-enofuranosyluronamide) adenine;
9 - (5,6 - dideoxy-2,3-O-isopropylidene-β-D-erythro-hept-trans-4-enofuranosyluronamide) guanine;
9 - (5,6 - dideoxy-2,3-O-isopropylidene-β-D-erythro-hept-trans-4-enofuranosyluronamide) hypoxanthine;
9 - (5,6 - dideoxy-2,3-O-isopropylidene-β-D-erythro-hept-trans-4-enofuranosyluronamide) 7-deazaadenine;
9 - (5,6 - dideoxy-2,3-O-isopropylidene-β-D-erythro-hept-trans-4-enofuranosyluronamide) xanthine;
2,6 - diamino - 9-(5,6-dideoxy-2,3,-O-isopropylidene-β-D-erythro-trans-4-enofuranosyluronamide) purine;
9 - (5,6 - dideoxy-2,3-O-isopropylidene-β-D-erythro-hept-trans-4-enofuranosyluronamide) 6-mercaptopurine;
9 - (5,6 - dideoxy-2,3-O-isopropylidene-β-D-erythro-hept-trans-4-enofuranosyluronamide) 6-mercapto-7-deazapurine;
1 - (5,6 - dideoxy-2,3,-O-isopropylidene-β-D-erythro-hept-trans-4-enofuranosyluronamide) uracil;
1 - (5,6 - dideoxy-2,3,-O-isopropylidene-β-D-erythro-hept-trans-4-enofuranosyluronamide) 5-fluorouracil;
1 - (5,6 - dideoxy-2,3,-O-isopropylidene-β-D-erythro-hept-trans-4-enofuranosyluronamide) 5-chlorouracil;
1 - (5,6 - dideoxy-2,3,-O-isopropylidene-β-D-erythro-hept-trans-4-enofuranosyluronamide) thymine;
1 - (5,6 - dideoxy-2,3,-O-isopropylidene-β-D-erythro-hept-trans-4-enofuranosyluronamide) 6-azauracil;
1 - (5,6 - dideoxy-2,3,-O-isopropylidene-β-D-erythro-hept-trans-4-enofuranosyluronamide) cytosine;
1 - (5,6 - dideoxy-2,3,-O-isopropylidene-β-D-erythro-hept-trans-4-enofuranosyluronamide) 5-fluorocyotosine;
1 - (5,6 - dideoxy-2,3,-O-isopropylidene-β-D-erythro-hept-trans-4-enofuranosyluronamide) 5-chlorocytosine;
1 - (5,6 - dideoxy-2,3,-O-isopropylidene-β-D-erythro-hept-trans-4-enofuranosyluronamide) 5-hydroxymethylcytosine; and
1 - (5,6 - dideoxy-2,3,-O-isopropylidene-β-D-erythro-hept-trans-4-enofuranosyluronamide) 5-methylcytosine.

Similarly, by following the same procedure as above using the corresponding 5'-olefinic nucleoside starting material of Formula Ia, and uracil analogs, as starting materials, the following cis isomers of Formula IIIb are respectively prepared and isolated:

9-(5,6-dideoxy-2,3-O-isopropylidene-β-D-erythro-hept-cis-4-enofuranosyluronamide) adenine;
9-(5,6-dideoxy-2,3-O-isopropylidene-β-D-erythro-hept-cis-4-enofuranosyluronamide) guanine;
9-(5,6-dideoxy-2,3-O-isopropylidene-β-D-erythro-hept-cis-4-enofuranosyluronamide) hypoxanthine;
9-(5,6-dideoxy-2,3-O-isopropylidene-β-D-erythro-hept-cis-4-enofuranosyluronamide) 7-deazaadenine;
9-(5,6-dideoxy-2,3-O-isopropylidene-β-D-erythro-hept-cis-4-enofuranosyluronamide) xanthine;
2,6-diamino-9-(5,6-dideoxy-2,3-O-isopropylidene-β-D-erythro-hept-cis-4-enofuranosyluronamide) purine;
9-(5,6-dideoxy-2,3-O-isopropylidene-β-D-erythro-hept-cis-4-enofuranosyluronamide) 6-mercapto-7-deazapurine;
1-(5,6-dideoxy-2,3-O-isopropylidene-β-D-hept-4-enofuranosyl-cis-uronamide) uracil;
1-(5,6-dideoxy-2,3-O-isopropylidene-β-D-hept-4-enofuranosyl-cis-uronamide) 5-fluorouracil;
1-(5,6-dideoxy-2,3-O-isopropylidene-β-D-hept-4-enofuranosyl-cis-uronamide) thymine;
1-(5,6-dideoxy-2,3-O-isopropylidene-β-D-hept-4-enofuranosyl-cis-uronamide) 6-azauracil;
1-(5,6-dideoxy-2,3-O-isopropylidene-β-D-hept-4-enofuranosyl-cis-uronamide) cytosine;
1-(5,6-dideoxy-2,3-O-isopropylidene-β-D-hept-4-enofuranosyl-cis-uronamide) 5-fluorocytosine;
1-(5,6-dideoxy-2,3-O-isopropylidene-β-D-hept-4-enofuranosyl-cis-uronamide) 5-chlorocytosine;
1-(5,6-dideoxy-2,3-O-isopropylidene-β-D-hept-4-enofuranosyl-cis-uronamide) 5-hydroxymethylcytosine; and
1-(5,6-dideoxy-2,3-O-isopropylidene-β-D-hept-4-enofuranosyl-cis-uronamide) 5-methylcytosine.

The 2',3'-O-isopropylidene protecting groups are respectively removed from a sample of each of the above β-D-allo and α-L-talo isomer mixtures of the compounds of Formula IIe, by treatment with formic acid according to the procedure of Example 1b.

Obviously, many modifications and variations of the invention, described herein above and below, can be

What is claimed is:
1. A compound selected from the group consiting of heptofuranosyl nucleosides having the formulas:

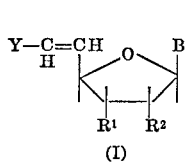 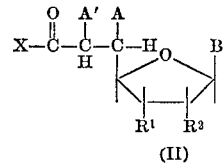

(I)            (II)

and

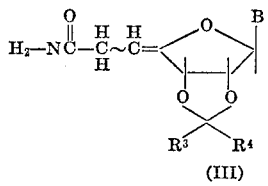

(III)

wherein B is a pyrimidine or purine base selected from the group of uracil-1-yl, thymin-1-yl, 5-trifluoromethyl-uracil-1-yl,6-azauracil-1-yl, 6-mercaptopurin-9-yl, hypoxanthin-9-yl, xanthin-9-yl, 6-mercaptodeazapurin-9-yl, 6-deazahypoxanthin-9-yl and those bases having the formulas:

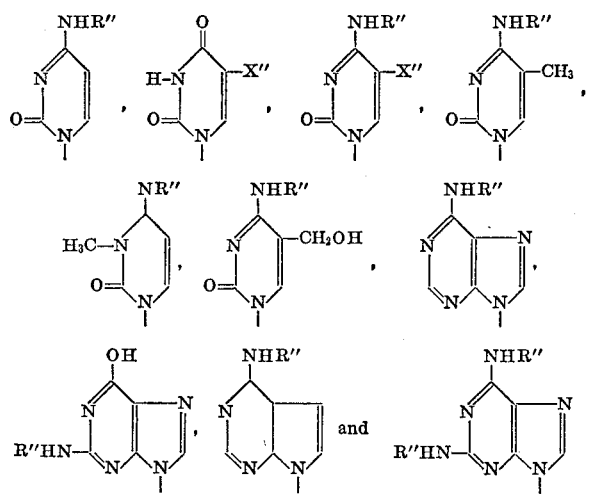

wherein R'' is hydrogen, lower alkyl having from 1 through 7 carbon atoms, lower acyl group having from 1 through 12 carbon atoms, aryl having from 6 through 12 carbon atoms; or an alkylaryl or arylalkyl having from 7 through 13 carbon atoms, and X'' is fluoro, chloro, bromo or iodo;

B' is as defined for B but is not uracil-1-yl, thymin-1-yl or 5-halouracil-1-yl;

Y is the group —C≡N or

wherein R is hydrogen or lower alkyl having from 1 through 7 carbon atoms;

X is the group —OR or —NR⁵R⁶ wherein R is hydrogen or lower alkyl and R⁵ and R⁶ are independently hydrogen, lower alkyl having from 1 through 7 carbon atoms, aryl having from 6 through 12 carbon atoms, or lower alkylaryl having from 7 through 13 carbon atoms; and wherein when X is —NR⁵R⁶ then A is hydrogen or the group —NR⁷R⁸ wherein R⁷ and R⁸ are independently hydrogen, lower alkyl having from 1 through 7 carbon atoms, aryl having from 6 through 12 carbon atoms, or lower alkylaryl having from 7 through 13 carbon atoms and A' is hydrogen, and wherein X is the group —OR where R is lower alkyl then both A and A' are each hydrogen or hydroxy or lower acyl having from 1 through 12 carbon atoms and where R is H then both A and A' are hydrogen, and when X is —OR and A and A' are hydrogen then B is not uracil-1-yl, thymin-1-yl or 5-halouracil-1-yl;

R¹ and R² are each hydroxy or together form the group

wherein R³ and R⁴ are independently hydrogen or lower alkyl;

and the wavy 5',6'-bond line in Formula III indicates both the cis and trans isomers with respect to the uronamide moiety and base (B) moiety.

2. The compound of claim 1 wherein said compound has the formula:

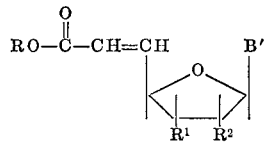

(Ia)

wherein B', R¹ and R² are as defined in claim 1.

3. The compound of claim 2 wherein B' is selected from the group consisting of adenine; 7-deazaadenine; 6-mercaptopurine; cytosine; and 5-fluorocytosine.

4. The compound of claim 1 wherein said compound has the formula:

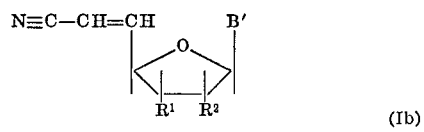

(Ib)

wherein B', R¹ and R² are as defined in claim 1.

5. The compound of claim 4 wherein B' is selected from the group consisting of adenine; 7-deazaadenine; 6-mercaptopurine; cytosine; and 5-fluorocytosine.

6. The compound of claim 1 wherein said compound has the formula:

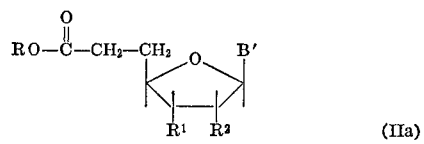

(IIa)

wherein B', R, R¹ and R² are as defined in claim 1.

7. The compound of claim 6 wherein B' is selected from the group consisting of adenine; 7-deazaadenine; 6-mercaptopurine; cytosine; and 5-fluorocytosine.

8. The compound of claim 1 wherein said compound has the formula:

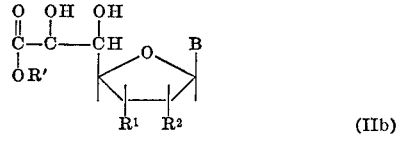

(IIb)

wherein R' is a lower alkyl having from 1 through 7 carbon atoms and B, R¹ and R² are as defined in claim 1.

9. The compound of claim 8 wherein B is selected from the group consisting of adenine; 7-deazaadenine; 6-mercaptopurine; cytosine; and 5-fluorocytosine.

10. The compound of claim 1 wherein said compound has the formula:

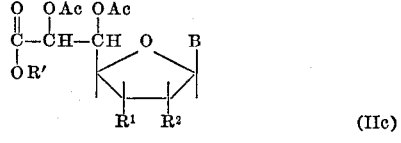

(IIc)

wherein Ac is an acyl group having from 1 through 12 carbon atoms.

11. The compound of claim 10 wherein B is selected from the group consisting of adenine; 7-deazaadenine; 6-mercaptopurine; cytosine; and 5-fluorocytosine.

12. The compound of claim 1 wherein said compound has the formula:

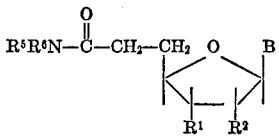

(IId)

wherein B, $R^1$ and $R^2$ are as defined in claim 1 and $R^5$ and R are independently selected from the group consisting of hydrogen, lower alkyls having from 1 through 7 carbon atoms, aryls having from 6 through 12 carbon atoms and lower alkylaryls having from 6 through 13 carbon atoms.

13. The compound of claim 12 wherein B is selected from the group consisting of adenine; 7-deazaadenine; 6-mercaptopurine; cytosine; and 5-fluorocytosine.

14. The compound of claim 1 wherein said compound has the formula:

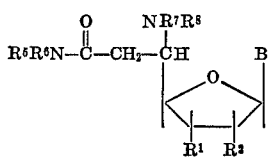

(IIe)

wherein B, $R^1$ and $R^2$ are as defined in claim 1 and $R^5$, $R^6$, $R^7$ and $R^8$ are independently selected from the group consisting of hydrogen, lower alkyls having from 1 through 7 carbon atoms, aryls having from 6 through 12 carbon atoms and lower alkylaryls having from 6 through 13 carbon atoms.

15. The compound of claim 14 wherein B is selected from the group consisting of adenine; 7-deazaadenine; 6-mercaptopurine; cytosine; and 5-fluorocytosine.

16. The compound of claim 1 wherein said compound has the formula:

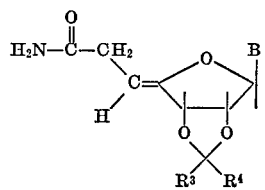

(IIIa) trans wherein B, $R^3$ and $R^4$ are as defined in claim 1.

17. The compound of claim 16 wherein B is selected from the group consisting of adenine; 7-deazaadenine; 6-mercaptopurine; cytosine; and 5-fluorocytosine.

18. The compound of claim 1 wherein said compound has the formula:

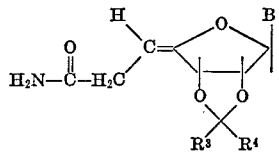

(IIIb') cis wherein B, $R^3$ and $R^4$ are as defined in claim 1.

19. The compound of claim 18 wherein B is selected from the group consisting of adenine; 7-deazaadenine; 6-mercaptopurine; cytosine; and 5-fluorocytosine.

References Cited
UNITED STATES PATENTS

| | | | |
|---|---|---|---|
| 3,459,734 | 8/1969 | Magerlein | 260—210 R |
| 3,466,252 | 9/1969 | Prahl | 260—209 R |
| 3,585,189 | 6/1971 | Verheyden et al. | 260—211.5 R |

OTHER REFERENCES

Howgate et al.: "Carbohydrate Research," vol. 12, 1970, pp. 403–407.

LEWIS GOTTS, Primary Examiner

J. R. BROWN, Assistant Examiner

U.S. Cl. X.R.

71—77, 88; 260—999

UNITED STATES PATENT AND TRADEMARK OFFICE
CERTIFICATE OF CORRECTION

PATENT NO. : 3,758,456
DATED : September 11, 1973
INVENTOR(S) : PIETER C. BAX ET AL It is certified that error appears in the above-identified patent and that said Letters Patent are hereby corrected as shown below:

Column 2, line 31, "$B_2$" should read -- B' --.

Column 9, line 14, "cytosine;" should read -- allo-heptofuranosyluronic acid) 5-hydroxymethylcytosine; --. Column 9, line 24, "-heptofuranosylmethylurano)" should read -- heptofuranosylmethyluronate) --.

Column 10, line 20, "2,3-isopropylidene-" should read -- 2,3-O-isopropylidene- --. Column 10, lines 68 and 69, "1-(5-amino-5,6-dideoxy-2,3-O-isopropylidene-β-D-allo trans-4-enofuranosyluronamide) adenine;" should read -- 9-(5,6-dideoxy-2,3-O-isopropylidene-β-D-erythro-hept-trans-4-enofuranosyluronamide) adenine: --. Column 10, line 70, "-β'-D-" should read -- -β-D- --.

Column 27, lines 42-45, that portion of the formula

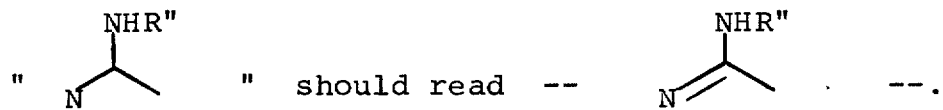

Column 29, line 16, "R" should read -- $R^6$ --.

Signed and Sealed this

Eleventh Day of January 1977

[SEAL]

Attest:

RUTH C. MASON
Attesting Officer

C. MARSHALL DANN
Commissioner of Patents and Trademarks